US008769022B2

(12) United States Patent
Tivyan

(10) Patent No.: US 8,769,022 B2
(45) Date of Patent: Jul. 1, 2014

(54) SYSTEM AND METHOD FOR EVALUATING OUTBOUND MESSAGES

(75) Inventor: Roman Tivyan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 12/551,503

(22) Filed: Aug. 31, 2009

(65) Prior Publication Data

US 2011/0055334 A1    Mar. 3, 2011

(51) Int. Cl.
*G06F 15/16* (2006.01)
*H04L 12/58* (2006.01)

(52) U.S. Cl.
CPC .......... *H04L 12/5875* (2013.01); *H04L 51/30* (2013.01); *H04L 12/585* (2013.01); *H04L 12/5895* (2013.01)
USPC ............................ 709/206; 709/202; 709/203

(58) Field of Classification Search
USPC ......................................... 709/202, 203, 206
See application file for complete search history.

(56) References Cited

U.S. PATENT DOCUMENTS

| | | | |
|---|---|---|---|
| 6,073,142 A | 6/2000 | Geiger et al. | |
| 8,402,529 B1 * | 3/2013 | Green et al. | 726/11 |
| 2003/0120584 A1 * | 6/2003 | Zarefoss et al. | 705/37 |
| 2004/0239992 A1 * | 12/2004 | Kawai et al. | 358/1.15 |
| 2006/0242471 A1 * | 10/2006 | Vadnais et al. | 714/47 |
| 2007/0088788 A1 * | 4/2007 | Goldberg et al. | 709/206 |
| 2007/0192322 A1 * | 8/2007 | Dandekar et al. | 707/9 |
| 2009/0157650 A1 * | 6/2009 | Chow et al. | 707/5 |
| 2009/0172102 A1 | 7/2009 | Chesnutt et al. | |
| 2009/0216875 A1 * | 8/2009 | Shi | 709/224 |
| 2010/0169472 A1 * | 7/2010 | Okamoto et al. | 709/224 |

FOREIGN PATENT DOCUMENTS

| | | |
|---|---|---|
| CN | 101471897 A | 7/2009 |
| JP | 2004302693 A | 10/2004 |
| JP | 2007087327 A | 4/2007 |
| JP | 2008083917 A | 4/2008 |
| JP | 2008097108 A | 4/2008 |
| WO | WO0068815 | 11/2000 |
| WO | WO2004032439 | 4/2004 |
| WO | WO-2008129915 A1 | 10/2008 |

OTHER PUBLICATIONS

International Search Report and Written Opinion—PCT/US2010/047288, International Search Authority—European Patent Office—Oct. 13, 2010.

* cited by examiner

*Primary Examiner* — Liangche A Wang
(74) *Attorney, Agent, or Firm* — James T. Hagler

(57) ABSTRACT

Methods and systems enable evaluating a message prior to transmission to one or more addressees. In an embodiment, a message element evaluator applies rules to message field elements which may include message addressee and content elements before the message is transmitted. When a message evaluation rule is violated, an alert may be presented to the user. A message evaluation rule may allow the sender to confirm sending of the message, initiate editing of the message, or cancel the message. A message evaluation rule may also prohibit the message from being sent until the message is modified to conform to the message evaluation rule. The methods and systems may be applied to a variety of message types including electronic mail, simple message system, multimedia message system, and instant message system messages.

56 Claims, 15 Drawing Sheets

SYSTEM AND METHOD FOR EVALUATING OUTBOUND MESSAGES

FIELD OF THE INVENTION

The present invention relates generally to messaging systems and more specifically to methods and systems for checking messages prior to transmission.

BACKGROUND

Messaging systems, including email, simple message service (SMS), multimedia message service (MMS) and instant messaging (IM) to name a few, allow users to quickly send information to selected recipients. Messaging systems typically involve an application that resides on a user computing device or an application that resides on a server device that provides messaging services to a client computing device. Messaging systems typically allows users to create message content, address the message, and send the completed message. Messaging systems may also assistant the user in addressing the message by referring to a directory of addresses and/or performing auto-complete functions.

While many messaging systems provide opportunities to filter incoming messages, such as "spam" filters, control of the outbound message is generally left to the user. As a result, users frequently make errors when sending messages, such as replying to all when the reply was intended for a particular person or including an unintended recipient. Additionally, messages are often sent with content that is inappropriate for some addressees. The consequences of such mistakes can range from embarrassment to financial losses, such as when company secrets are inadvertently sent to a competitor.

SUMMARY

Various embodiments provide methods and systems for monitoring and detecting potential problems in outbound messages and providing warnings to users to enable them to correct the problem before the message is transmitted. Some embodiments examine addressees for potential conflicts, common addressing mistakes and other types of addressing problems. Some embodiments examine message element contents, such as the message body, for contents that are inappropriate or may require further consideration by the sender. Some embodiments detect inclusion of message content elements, such as message body contents, that are inappropriate for one or more message address elements.

In an embodiment, a message element evaluator is configured to operate on a message generated by a messaging application before the message is transmitted. The functions of the message element evaluator may be triggered by a user selection of the "send" command. Prior to sending the message to a messaging server, the message element evaluator may check the fields of the message to detect errors in the addressee selection and/or the message content. In an embodiment the process of evaluating message elements is accomplished by applying one or more rules to the message elements. In an embodiment, a basic rule set may be established by an administrator of the message system which may be extended by a user of the message system. If the message violates one or more of the rules, the message element evaluator may present one or more alert messages to the user that are appropriate to the rule or rules that are violated by the message. In an embodiment, the rules may be context driven and may depend on the addressee, addressee domain, sender name, sender domain and message content.

By way of illustration and not by way of limitation, a message element evaluator may be configured to operate with an email message, an SMS application, a MMS application, and an instant messaging application. In a further embodiment, the message element evaluator may be configured as a service on a server that is accessed by a client application on a computing device in a client-server architecture.

DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
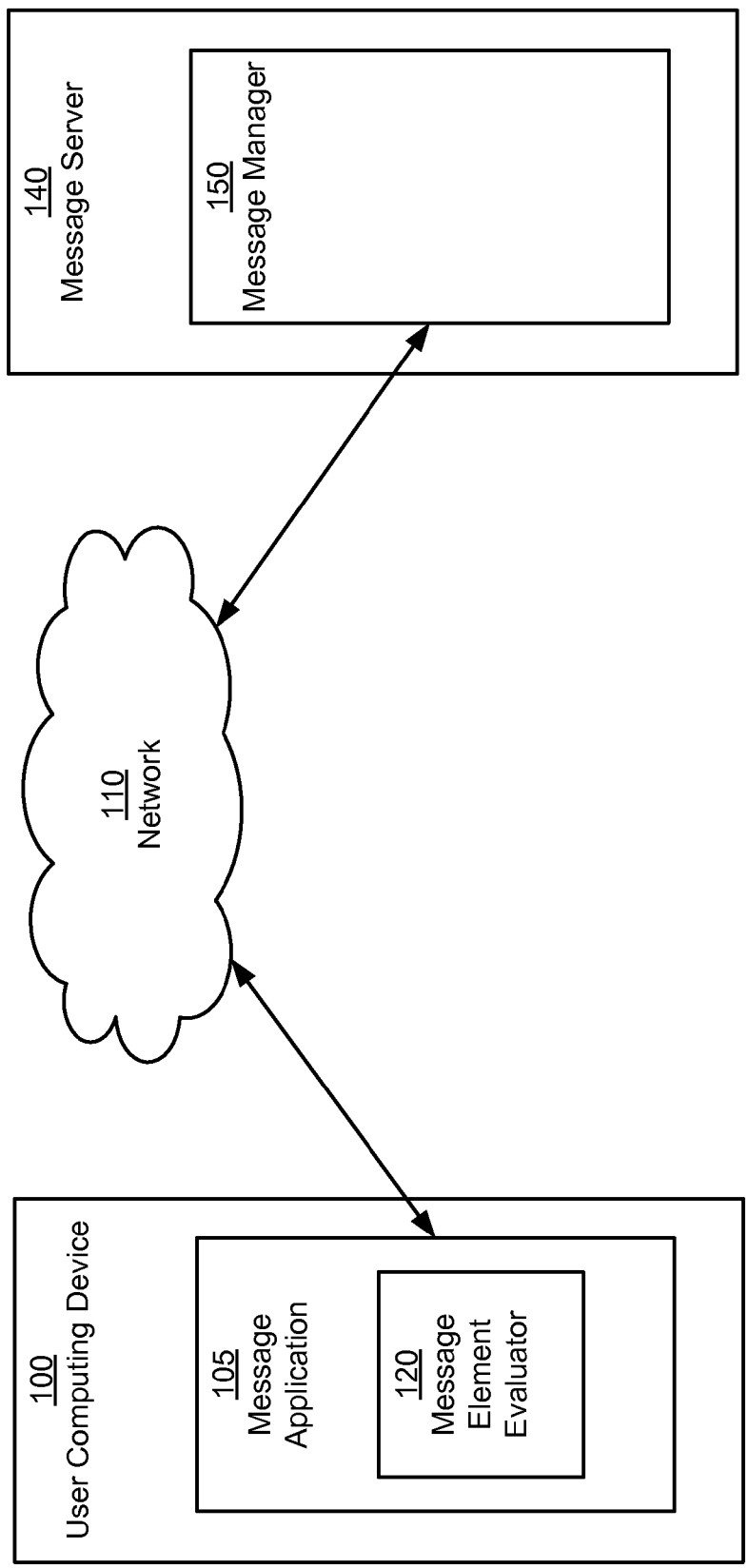
FIG. 1 is a communication system block diagram illustrating the logical components of a messaging system using an application configured to operate a message element evaluator according to an embodiment.

Various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the term "message field" is intended to encompass all fields of any message format as currently defined or as may be defined in the future, including addressee fields, sender address fields, subject line fields, message body fields, message priority fields, message date and time fields, message routing information fields and message metadata fields. The terms, "message address elements" and "message content elements" are used to distinguish the addressing elements from the message content elements, such as the message subject line (if included in the message type) and message body elements.

While the various aspects are described with reference to specific messaging system embodiments, including SMS, e-mail and instant messaging systems, the present invention may be applied to any messaging system or protocol that is known or will be developed.

As noted above, typical messaging systems involve a messaging application that resides on a user computing device or a messaging application that resides on a server device which provides messaging services to a client computing device ("client-server" implementations). The various embodiments may be applied to both types of implementations and examples of each are provided in the embodiments described below. As used herein, "application" refers to software instructions residing on the particular device (i.e., computing device or server device), while "client" refers to software instructions downloaded to a client computing device by a server in a client-server implementation. However, as one of skill in the art would appreciate, messaging systems implemented as applications on a computing device rely upon messaging servers for the functions of relaying messages, and client-server implementations may rely upon some application software installed on the client computing device. Therefore, the terms "application" and "client" are used for descriptive purposes only and are not intended to be mutually exclusive or require that a particular type of software architecture be implemented.

Messaging systems are widely used by both individuals and businesses. While many messaging systems provide opportunities to filter incoming messages, control of the outbound message is generally left to the user. As a result, messages may inadvertently include message address elements that cause the message to be directed to one or more recipients that are not the intended addressee. For example, a common user mistake is to "reply to all" when the reply message is intended just for one recipient. Another common user mistake involves sending a message to the wrong addressee (e.g., when an addressee field is automatically filled upon the entry of one or two initial letters) or sending a message to a group of addresses including one or more addressees that should not receive it. Another common error involves sending messages with content elements that are inappropriate for communication to an addressee. For example, a common user mistake occurs when a message with an extended chain of responses is sent to an individual who should not receive content in one of the earlier included messages. Another common user mistake occurs when a user does not know or realize that confidential or sensitive information in the message should not be sent to a particular addressee.

For example, in a customer service environment, email may be used to communicate with customers. In such an implementation, users may routinely send messages to several different customers, some of which may be competitors. As such, there is the potential to send a message intended for one company to a competitor, or include addressees for two or more competitors in the same message. Common messaging aids, such as the "reply to all" option and addressing tools which suggest addresses based upon one or two letters can contribute to such mistakes.

To reduce such messaging mistakes, the various embodiments provide additions to or enhancements for email messaging systems that automatically filter outgoing messages before each message is allowed to be sent. In the various embodiments message address elements and/or the message content elements may be evaluated for problems and a notification of detected problems provided to a sender before the message is actually transmitted thereby affording the sender an opportunity to correct a potential mistake. As will be described in detail below, this evaluation function may be applied to messaging systems and message structures generally. The user or an administrator of the messaging system may specify filter options to search the email message for keywords, such as two different company names (e.g. Doitright and Doitall) or two different address domains. Before a message is transmitted, the messaging application or messaging client may apply a message element evaluator to "scrub" the message address elements and message content elements. The message element evaluator may apply a number of rules as part of scrubbing process. For example, a rule condition may be satisfied when two or more key words are found in the message, in response to which the message element evaluator may cause the display of a pop-up screen identifying the issue found in the message and prompting the sender to confirm that the message should be sent. For example, if a message contains two different company names somewhere in the message content elements or message address elements, a warning pop up may be generate before the message is sent to enable the user to confirm that the two references can safely be included in the same message.

In an embodiment, a message element evaluator may be configured to operate with a messaging application on a computing device (e.g., a personal computer or mobile communication device). Such a message element evaluator may be a software module including some or all of the functionality described herein that is implemented on a processor of the computing device as part of the messaging application or as a separate application. The functions of the message element evaluator may be triggered by selection of the "send" command by a user, such as selection of the send command presented in graphical user interface generated by the messaging application. Prior to sending the message to a messaging server, the message element evaluator may check the fields of the message to detect potential errors. Potential errors may be detected by applying a set of rules to the message elements, such as the addressee, subject and/or in the message body elements. In an embodiment, a basic rules set may be established by the administrator of the message server and extended by the user of the application. If the message element evaluator determines that the message violates one or more of the rules, the message element evaluator may present one or more alert prompts to the user. Such alerts may be defined within the rules set so that an appropriate prompt can be generated depending upon the particular rule or rules violated by the message. For example, for some rules the alert message may be merely informational, while for other rules the alert message may require the user to take an action before the message is transmitted. As a further example, some rules may be mandatory such that the alert may not be overridden by the user and the message element evaluator may block transmission of the message until the message is revised to conform to the rules.

Figure 13:
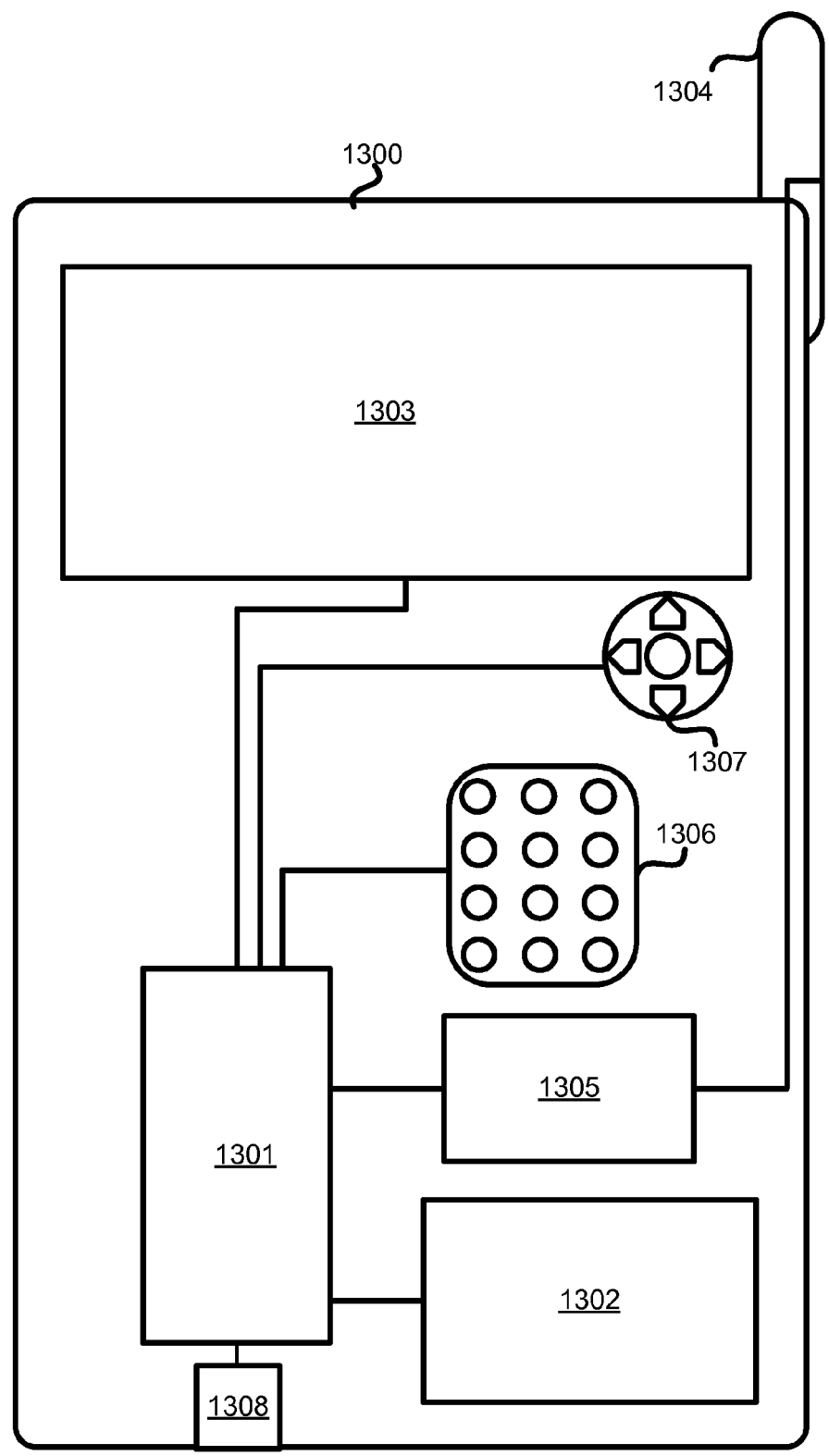
FIG. 13 is a component block diagram of a mobile device suitable for use with the various embodiments.

FIG. 1 is a communication system block diagram illustrating example functional components of a messaging system using a message element evaluator application according to an embodiment. In this example embodiment, a user computing device 100 operates a messaging application 105. The user computing devices may be, for example, a desktop computer, a laptop computer, a PDA, a cellphone, a smartphone, a web-TV terminal, or any other electronic device configured to create and send a message. The messaging application 105 may be configured to receive information for use in generating message field elements from a user via one or more input devices (not illustrated in FIG. 1). By way of illustration and not by way of limitation, input devices may include one or more of keyboards, touchscreen displays, keypads, voice recognition systems, and computer pointing devices such as a computer mouse. Further descriptions of components of typical computing devices 100 are provided below with reference to FIGS. 13 and 14.

The messaging application 105 typically formats information received from the user into a number of message field element. Such message field elements may include the addressee fields, sender address fields, subject line fields, message body fields, message priority fields, message date and time fields, message routing information fields and message metadata fields and other message field elements that may be used by the messaging application 105 to construct and send a message via a messaging network 110. Message field elements are generally dictated by the type of message being sent and the message protocol that is being used to send the message. The message protocol may establish mandatory field data, such as message address elements that provide sufficient information to determine where a message is to be sent.

The messaging application 105 may be configured to cooperate with the message element evaluator 120 as described below. The messaging application 105 may transmit a message by communicating with a message manager 150 operating within a message server 140 via the message network 110. The message manager 150 then typically receives a message and routes it to a destination computing device (not shown) via the message network 110.

Figure 2:
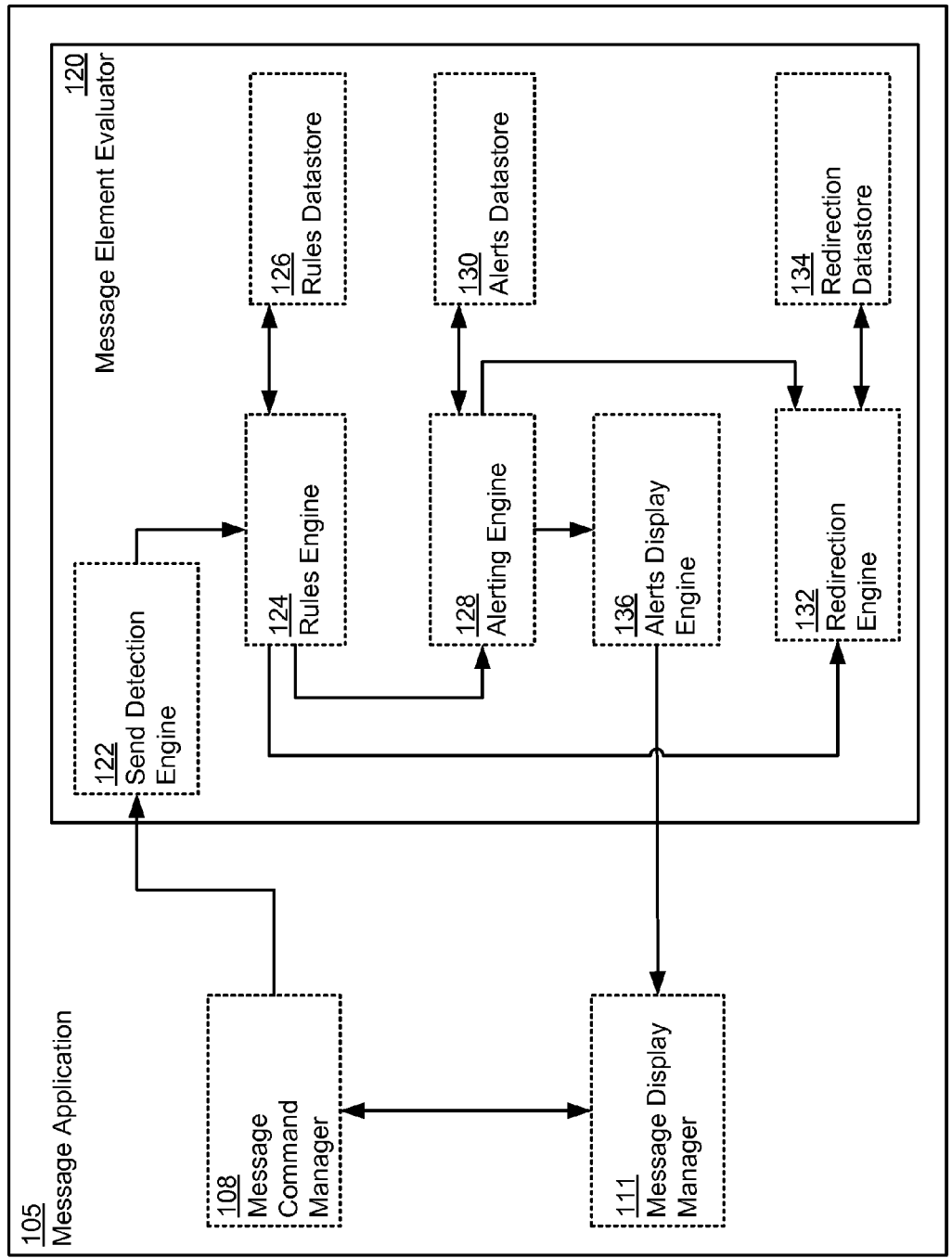
FIG. 2 is a block diagram illustrating the logical components of a message element evaluator operating in an application according to an embodiment.

FIG. 2 is a block diagram illustrating example functional components of a message element evaluator 120 operating within a messaging application 105 according to an embodiment. The messaging application 105 typically includes an application command manager 108, or equivalent functionality, and an application display manager 111, or equivalent functionality. The application command manager includes the functionality associated with generating and transmitting outgoing messages, as well as displaying and storing incoming messages. The application display manager 111 includes the functionality to generate a graphical user interface (GUI) that may be displayed on the user computing device 100. A GUI typically displays objects that may be selected by a user via an input device to issue commands to the application command manager 108.

The message element evaluator 120 includes the functionality described herein and may be implemented as separate application, as a functional module (as illustrated) or as functionality included within the messaging application 105. The message element evaluator 120 may include a send detection engine 122 or functional component. The send detection engine 122 cooperates with the application command manager 108 to detect the issuance of a "send" command by the application 105, such as when a user clicks on the "send" icon within the GUI. For example, the send detection engine 122 may include process steps to periodically evaluate a flag in memory that is set when the "send" icon is activated, and launch the message element evaluator 120 when that flag is set. The send detection engine 122 is optional since in some implementations activation of the "send" icon may directly activate the message element evaluator 120. In response to the detection of a send command, the send detection engine 122 may send the message address elements and the message content elements to the rules engine 124. In some embodiments, the send detection engine 122 may parse the message to obtain the various elements to be evaluated and pass those elements to the rules engine 124. In other embodiments, the rules engine 124 may obtain the message directly from memory and parse the message to obtain the elements to be evaluated. The rules engine 124 may obtain appropriate rules from a rules datastore 126 and apply them to the message address elements and/or the message content elements as described more fully below.

The rules datastore 126 may include rules that may be applied to all messages and rules that may be applied based on the content of each message. Rules may be provided in a variety of forms, such as conditions or tests and corresponding action(s). For example, if a message element satisfies a rule's condition or test, the action or actions specified in the rule may be performed. By way of illustration and not by way of limitation, a rule may be established that prohibits the sending of messages to a particular addressee, such as disreputable individuals (e.g., known "spammers"). As another illustrative example, rules may be established prohibiting the sending of messages to particular domains, such as those of a competitor.

More complex tests and conditional actions may also be implemented, including additional processing on the message beyond simply generating a prompt or warning. In an embodiment, particular grammar, word usage, or content evaluations may be conducted when a test condition is satisfied, with the resulting recommended changes displayed to the user in a prompt. For example, a test condition may be whether a message contains a company name or trademark (e.g., "Qualcomm"), which when satisfied triggers an action to apply a set of grammar rules to ensure that the company name or trademark usage complies with company policies or legal requirements (e.g., including trademark insignia or properly using the complete trademark). Applying such rules to trademarks and tradenames could help companies avoid allowing trademarks to become generic terms. As another example, a test condition may compare the addressees to a list of customers, company management, or government officials, which when satisfied triggers a set of grammar rules to identify and correct informal phrases, slang, and unprofessional language. As a third example, a test condition may be whether the message includes a photograph, which when satisfied compares the addressees to a list of addressees who should not be sent photographs.

Some additional exemplary rule conditions are set forth in Table 1 which are provided for illustrative purposes only.

TABLE 1

| Rule | Condition | Action |
|---|---|---|
| Messages to Bob should not be copied to anyone other than Fred, Mary or Bill at the same domain | If the "TO" field = "Bob@domain" and if any other address in the "TO" field, the "CC" field or the "BCC" field is not "Fred," | Generate prompt: "Message addressee conflict: Messages to Bob should not be copied to anyone other |

TABLE 1-continued

| Rule | Condition | Action |
|---|---|---|
| | "Mary," or "Bill" @domain | than Fred, Mary or Bill." Transmit on user confirmation. |
| Messages should not be sent to more than "X" recipients | Count TO" field, "CC" field and "BCC" field entries; if Count>X | Generate prompt: "Message address error: more than X recipients." Transmit on user confirmation. |
| Messages to domain "Acme" should not include references to domain "Beta" | If the "TO" field = "@ACME " and if any other address in the "TO" field, the "CC" field, the "BCC" field or the body contains the domain "beta" | Generate prompt: "Message addressee conflict: Message addressed to both Acme and Beta." Transmit on user confirmation. |
| Messages from Bob@domain should not be sent to any other domain | If the "FROM" field is Bob@domain, then the "TO" field, the "CC" field, and the "BCC" field must = @domain. | Generate prompt: "Message addressee conflict: Messages addressed to Bob and another domain." Transmit on user confirmation. |
| Bob shall not send to the Groups A, B or C. | If the "FROM" field is Bob@domain, then the "TO" field, the "CC" field, and the "BCC" field may not include links to Group A, B, or C. | Generate prompt: "Message addressee error: Bob should not send messages to Groups A, B or C." Block transmission. |
| Messages should not refer to two or more unrelated entities | If the message body contains a reference to Acme, and any one of Beta, Gamma, and Phi. | Generate prompt: "Message addressee conflict: Message addressed to two or more unrelated entities." Block transmission. |

As the examples in Table 1 illustrate, rules may involve a variety of conditions or tests, and alert as well as transmission actions. Rules may test multiple different message fields individually or collectively. Conditions or test may be for specific words, addresses or address domains. Actions to be implemented with the rule condition is satisfied may include generating a display to alert the user, such as an alert that explains the particular violation or issue identified, as well as a display of user actions that may be taken.

The rules engine 124 may select rules from the rules datastore 126 based on the context of the message as defined by the message element contents. That is, the rules may be selected by the rules engine 124 based on the content of one or more fields within the sent message. For example, a rule may be established that prohibits the sending of a message to an addressee or to a domain from a particular sender. Such a context rule which is implemented based upon the context of the particular sender may be invoked to enforce different permissions for each of the various users of a messaging system.

Context rules may also be used to alert a sender of a potential error in the content of the message within the context of a particular addressee. For example, the message fields may be evaluated to determine if the message content elements are inappropriate for the addressee or addressees. By way of illustration, a rule might establish that a message addressed to John at Acme.com should not refer to anyone at Beta.com. Another rule may establish that a message addressed to John at Acme.com should not contain any other addressees in any field that could result in a copy of the message being sent to another individual.

The rules engine 124 may act through or provide its results to an alerting engine 128 and, optionally, a redirection engine 132. The rules engine 124 may do so, for example, by forwarding the action corresponding to a satisfied rule or by forwarding the identifier for a satisfied rule. The alerting engine 128, which may be a functional component or part of the functionality of the message element evaluator 120, includes functionality sufficient to generate a display for the user consistent with the actions specified in a satisfied rule. The alerting engine 128 may receive the information to be displayed from the rules engine 124, from the rules datastore 126 (e.g., by using an index of a satisfied rule to look up the corresponding action), or by referring to an alerts database 130 to select an alert that is appropriate to the determination made by the rules engine 124 (e.g., by selecting an alert corresponding to an index of a satisfied rule).

As Table 1 illustrates, an alert may be cautionary, informative or prohibitory. Some rules may be provided to cause a sender to think about the violated condition before sending the message (e.g., confirming that the message should be sent to more than 50 addressees). For example, an alert may caution a user that a rule has been violated. An alert may simply inform the user of a finding, as in "The message you have sent to John will also be sent to Bob." A cautionary or informative alert may prompt the sender to input whether the message should be sent. Thus, if an action permits transmission of the message upon user confirmation, the action may include generating a prompt (e.g., a GUI hyperlink icon) to receive user directions, such as to transmit the message or return to the messaging application to edit the message fields. For example, the alert may end with, "To send, please click the confirm button or click on the cancel button and your message will not be sent." Other rules may be provided that preclude transmission until the offending condition is corrected, such as sending a message addressed to two competing suppliers.

For example, if the user cannot override the rule, the action may include generating a prompt to return to the messaging application to edit the message fields. Send confirmation and cancel commands are discussed below.

Alerts may be formatted for display by the messaging application 105 according to instructions executed by the alerts display engine 136. In response to the rules engine 124 indicating that a particular rule is satisfied, the alerts display engine 136 may cooperate with the application display manager 111 to cause the display of an alert message or display an alert icon that is linked to an alert message. In an embodiment, attributes of the alert message may be set by the user. For example, in an embodiment a user may set the font, font color, window size, alert icon shape, alert icon color, and other display aspects, such as whether the alert icon blinks or remains constant.

The alerts display engine 136 may further cooperate with the messaging application display manager 111 to cause display of a "confirm send" prompt object (e.g., a hyperlink button), an "edit message" prompt object, and/or a "cancel message" prompt object when a rule violation does not prohibit the sending of the email.

In an embodiment, selection of a "confirm send" command by the user releases the message for transmission by the messaging application 105. This transmission release is different from the functionality activated by the send command which triggers the message element evaluator 120 functionality. Thus, user activation of a "confirm send" command does not return the message to the message element evaluator 120. On the other hand, if the user selects an "edit message" command and revises the message in the messaging application before selecting "send" again, the edited message may be evaluated by the message element evaluator 120 a second time.

A rule may also prohibit a message from being sent until the offending condition is corrected. In this situation, an alert message may not provide a "send confirmation" object and instead provide only an "edit message" and/or a "cancel message" object. For example, the alert message may read, "You are not authorized to send messages to Acme.com. This message will not be sent."

An optional redirection engine 132, which may be provided as a functional module or as part of the functionality of one of the other modules or the messaging application, may be configured to review the determinations of the rules engine 124 and the alert engine 128 to whether the message and/or the alert should be redirected to another address. For example, a message from a user who is not authorized to send a message to John at acme.com may be redirected to the address of a security person who could investigate the message. Alternatively or in addition, the generated alert may be redirected to an IP manager and logged for further action. Such logged alerts may be used to select the sender for additional training or to modify rules or create new rules. A redirection engine 132 may be configured to work in cooperation with an optional redirection datastore 134 in which are stored rules and addresses for redirecting messages flagged by the rules engine 124.

Figure 3:
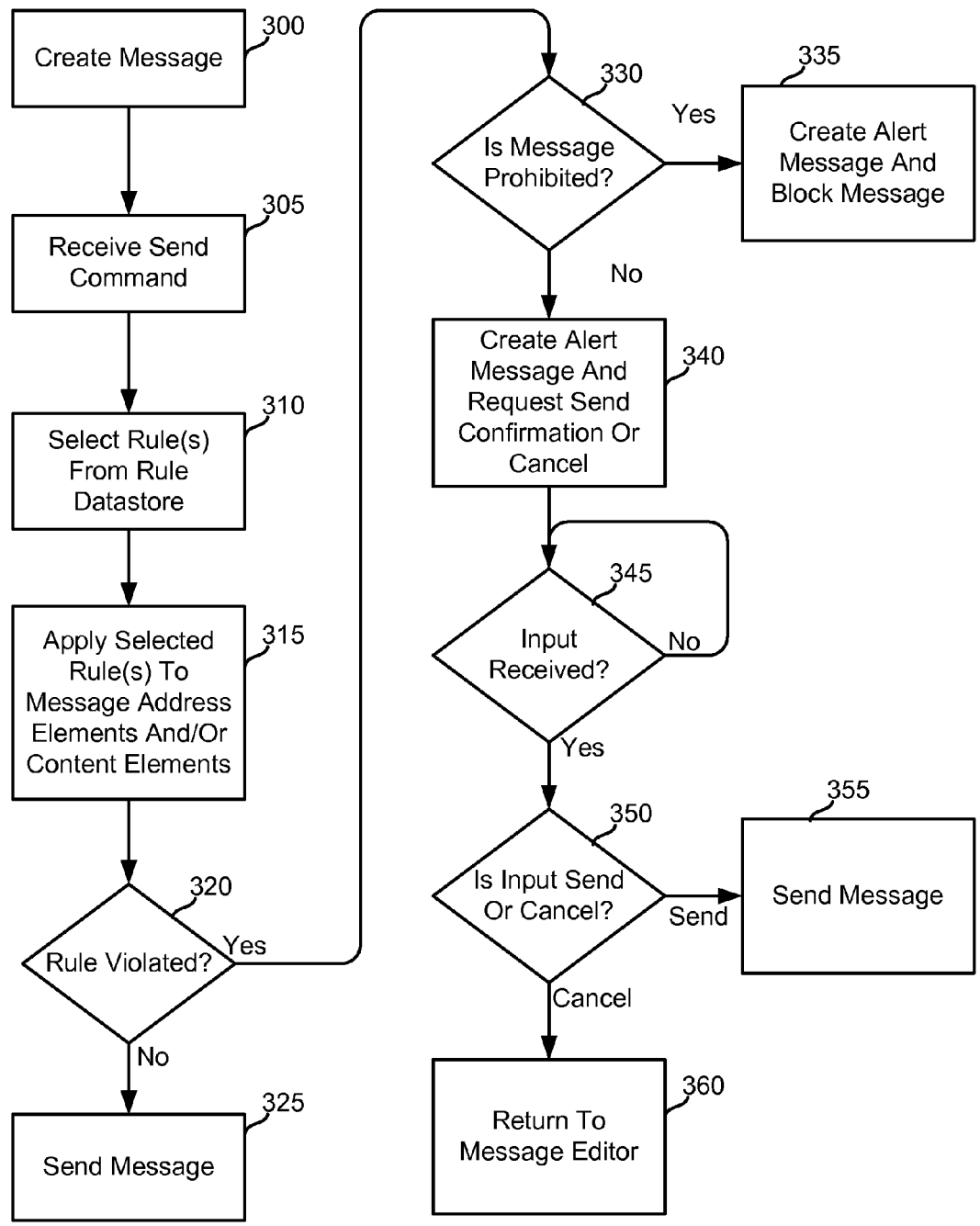
FIG. 3 is a process flow diagram illustrating a flow of a message evaluation process according to an embodiment.

FIG. 3 is a process flow diagram illustrating evaluation of a message according to an embodiment. A message may be created using a messaging application 105 operating on a user computing device 100, step 300. When it is ready to be sent the messaging application may receive a send command from the user, step 305. In response to the receipt of the send command, the message element evaluator 120 functionality is activated and one or more rules may be selected from a rules datastore 126, step 310. The message element evaluator 120 applies the selected rule to the message address elements, the message content elements or both (as well as other message elements) as dictated by the selected rule or rules, step 315.

For example, a rule may establish that a message addressed to John at Acme.com should not refer to anyone at Beta.com, in an addressee field, a message subject field, or a message body field. Another rule may establish that a message addressed to John at Acme.com should not contain any other message address elements that could result in a copy of the message being sent to another individual. Yet another rule may establish that a message addressed to "Robert" not use the nickname "Bob." In these examples, if the message to be sent is addressed to John@Acme.com, the first two example rules may be selected in step 310, and if the message also includes "Robert" as an addressee, the third example rule may also be selected.

The rules engine 124 may determine whether any of the selected rules have been violated, determination 320. When a rule has not been violated (i.e., determination 320="No"), the message may be released for transmission, step 325. When a rule has been violated (i.e., determination 320="Yes"), the rules engine 124 (or another functional element of the message element evaluator 120) may determine whether the violated rule prohibits transmission of the message, determination 330. When the rule prohibits transmission of the message (i.e., determination 330="Yes"), an alert message may be displayed informing the user that sending the message is prohibited and transmission of the message may be blocked, step 335. When the rule does not prohibit the sending of the message (i.e., determination 330="No"), an alert message may be displayed informing the user that a rule has been violated and requesting the user to confirm transmission of the message or edit or cancel the message, step 340. The message element evaluator 120 may wait for reception of a user input, determination 345, which may be subject to a time-out threshold (not illustrated). If a time-out threshold is reached before an input is received, the message may be canceled and processing returned to the messaging application 105.

When a user input is received (i.e., determination 345="Yes"), the message element evaluator 120 may determine whether the input is a send confirmation or cancel command, determination 350. When the input is a send confirmation command (i.e., determination 350="Send"), the message may be released for transmission, step 355. When the received user input is a cancel command (i.e., determination 350="Cancel"), the message send command may be canceled and processing may be returned to the messaging command manager 108 of the messaging application 105 to enable the user to edit the message or draft a different one, step 360.

The content of the alert message to be displayed when a rule condition is satisfied may be determined or selected by the user or by an administrator of the messaging system. By way of example and not by way of limitation, an alert message may include the rule that was violated and instructions on how the message may be corrected to overcome the rule violation. In an embodiment, an administrator may establish default rules, and the user may be permitted to augment the default rules, such as by creating personal message evaluation rules, in a manner that does not override or conflict with the default rules.

Figure 4:
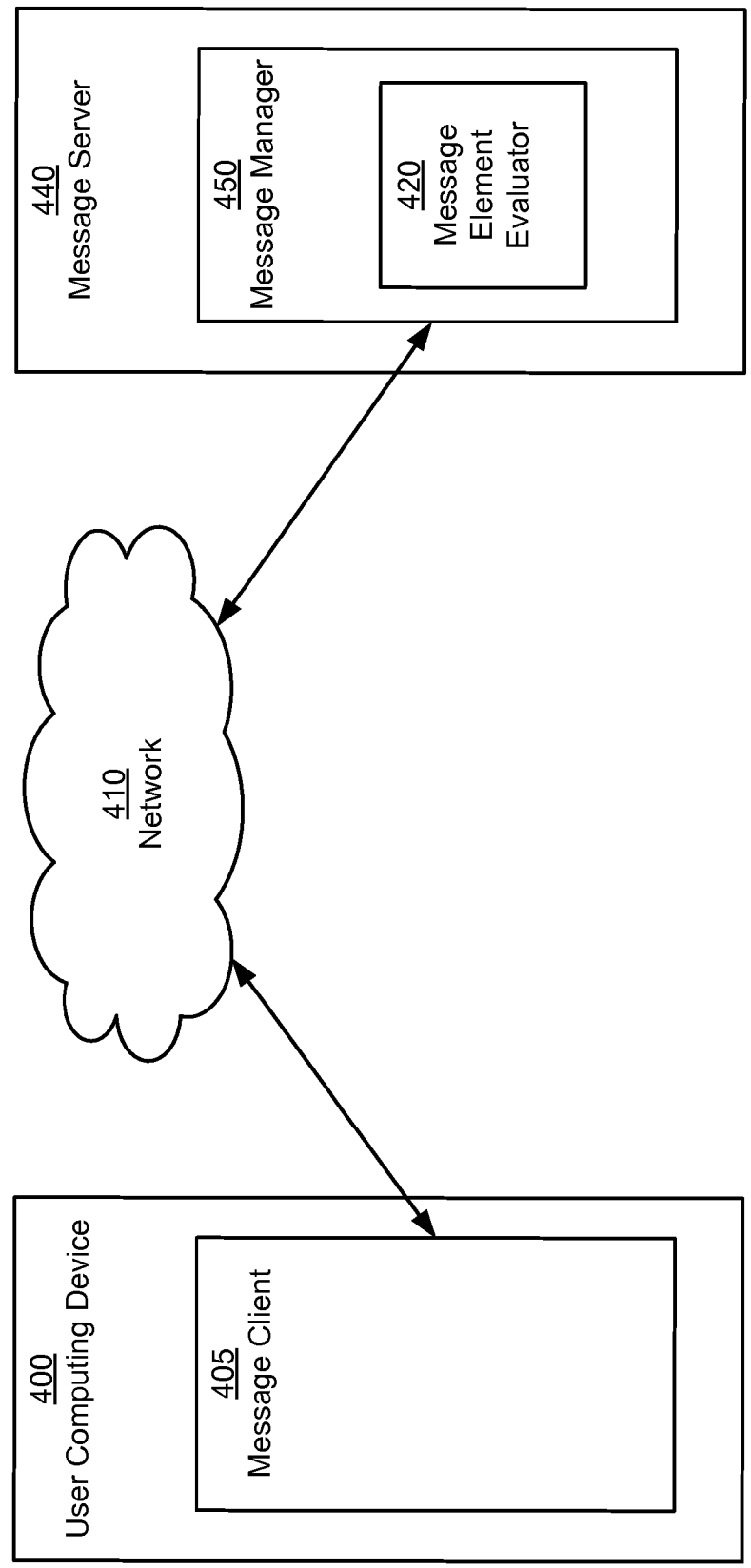
FIG. 4 is a block diagram illustrating the logical components of a messaging system using a message manager configured to operate a message element evaluator according to an embodiment.

As mentioned above, messaging systems may be implemented in a client-server system architecture. FIG. 4 is a block diagram illustrating example functional components of a messaging system including a message element evaluator suitable for use in a client-server architecture according to an embodiment. As illustrated in FIG. 4, the message element evaluator 420 functionality may reside in the messaging server 440 and cooperate with the message manager service 450 located in the message server 440. In this embodiment, a messaging client 405 may be hosted on the user computing device 400 to generate messages in collaboration with the message manager service 450 via a messaging network 410. User inputs may be formatted by the messaging client 405 or passed to the message manager service 450 for processing. When the user indicates the message should be sent, the message element evaluator service 420 may take over processing to evaluate the message elements as described below.

Figure 5:
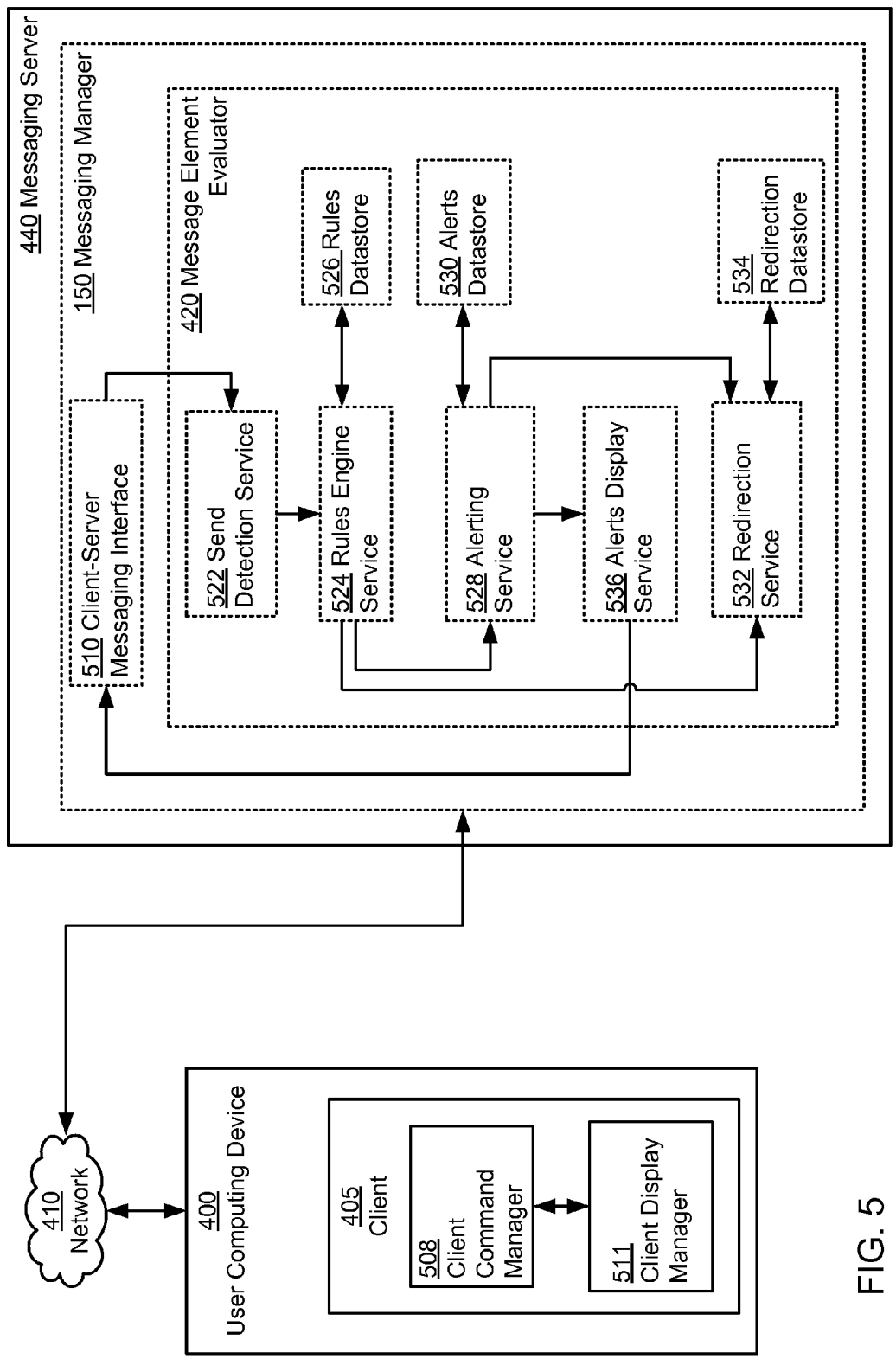
FIG. 5 is a block diagram illustrating the logical components of a message element evaluator operating in a message manger according to an embodiment.

FIG. 5 is a block diagram illustrating example functional components of a message element evaluator service 420 operating within a message manger service 450 according to an embodiment. The messaging client 405 may include a client command manager 508 and a client display manager 511. The client display manager 511 may generate a GUI that may be displayed on the user computing device 400. Similar to the embodiment discussed above with reference to FIG. 2, the GUI may display objects for selection by a user using an input device (not illustrated) to issue commands to the client application command manager 508.

The messaging server 440 may include the messaging manager service 450. The messaging manager service 450 may include a client-server messaging interface 510 and the message element evaluator service 420.

The client-server messaging interface 510 may cooperate with the messaging client 405 via the messaging network 410. The client-server messaging interface 510 may cooperate with the message element evaluator service 420 via a send detection service 522 and an alerts display service 536 as discussed below.

The send detection service 522 may have functionality enabling it to recognize when a user has selected the "send" command on the user computing device 400. The send detection service 522 may do so by cooperating with the client command manager 508 or upon receiving a formatted message for transmission, for example. In response to the detection of a send command, the send detection service 122 may send the message address elements and the message content elements to the rules engine 524. In some embodiments the send detection service 522 may parse the message received from the client command manager 508 to obtain the various elements to be evaluated and pass those elements to the rules service 524. In other embodiments the rules service 524 may obtain the message directly from server memory or from the client-server messaging interface 510 and parse the message to obtain the elements to be evaluated. The rules service 524 may obtain appropriate rules from a rules datastore 526 and apply them to the message address elements and/or the message content elements as described more fully below.

The rules datastore 526 includes rules that may be applied to all messages and rules that may be applied to messages based on the content of each message. As described above with reference to FIG. 2, rules may be established prohibiting the sending of messages to particular addressees or particular address domains.

Similar to the embodiment discussed above with reference to FIG. 2, the rules service 526 may select rules from the rules datastore 526 based on the content of one or more fields within the sent message. Context rules may also be used to alert a sender of a potential error within the content of the message in the context of a particular addressee or addressees.

The rules service 524 may act through or provide its results to an alerting service 528 and, optionally, a redirection service 532. The rules service 524 may do so, for example, by forwarding the action corresponding to a satisfied rule or by forwarding the identifier for a satisfied rule. The alerting service 528, which may be a functional component or part of the functionality of the message element evaluator service 420 or the messaging manager server 450, includes functionality sufficient to generate a display to be relayed back to the user computing device 400 via the client-server messaging interface 510 and the message network 410. The alerting service 528 may receive the information to be displayed from the rules service 524, from the rules datastore 526 (e.g., by using an index of a satisfied rule to look up the corresponding action), or by referring to an alerts datastore 530 to select an alert that is appropriate to the determination made by the rules service 524 (e.g., by selecting an alert corresponding to an index of a satisfied rule).

As described above with reference to FIG. 2, alerts may be cautionary, informative or prohibitory. Alerts may be formatted for display by the messaging client 405 according to instructions provided by an alerts display service 536, such as XML or HTTP instructions conveyed via the client-server messaging interface 510. Thus, the alerting service 528 may direct the alerts display service 536 to generate an alert for display on the user computing device 400 which is transmitted to the client display manager 511 via the client-server messaging interface 510 and the messaging network 410. The client display manager 511 may receive the display instructions and cause the messaging client 405 to display an alert message or display an alert icon that may be linked to an alert message. In an embodiment, attributes of the alert message may be set by the user, such as by transmitting formatting selections to the messaging server 440 for storage in the alerts datastore 530 or rules datastore 526. For example, the alerts display service 536 may generate instructions to cause the messaging client 105 to display a "confirm send" prompt object (e.g., a hyperlink button), an "edit message" prompt object, and/or a "cancel message" prompt object when a rule violation does not prohibit the sending of the email. In an embodiment, selection of a "confirm send" command by the user releases the message for transmission by the messaging server 405.

A rule may also prohibit a message from being sent until the offending condition is corrected. In this situation, an alert message may not provide a "send confirmation" object and instead provide only an "edit message" and/or a "cancel message" object.

An optional redirection service 532, which may be provided as a functional module or as part of the functionality of one of the other modules or the messaging server 440, may be configured to review the determinations of the rules service 522 and the alert service 528 to determine whether the message and/or the alert should be redirected to another address.

The processing messages by the message element evaluator service 420 may be logically similar to that described above with reference to FIG. 3. Functional differences arise because the message element service 420 performs its functioning as part of the message server 140 functionality and sends alert messages to the messaging client 405 within the user computing device 400 over the messaging network 410. This interaction is facilitated by the client-server messaging interface 510.

As mentioned above, the various embodiments may be used with a wide variety of messaging systems and protocols. By way of illustration, example embodiments for use with electronic mail ("email"), short message service (SMS) and instant messaging (IM) messaging protocols are provided below.

Figure 6:
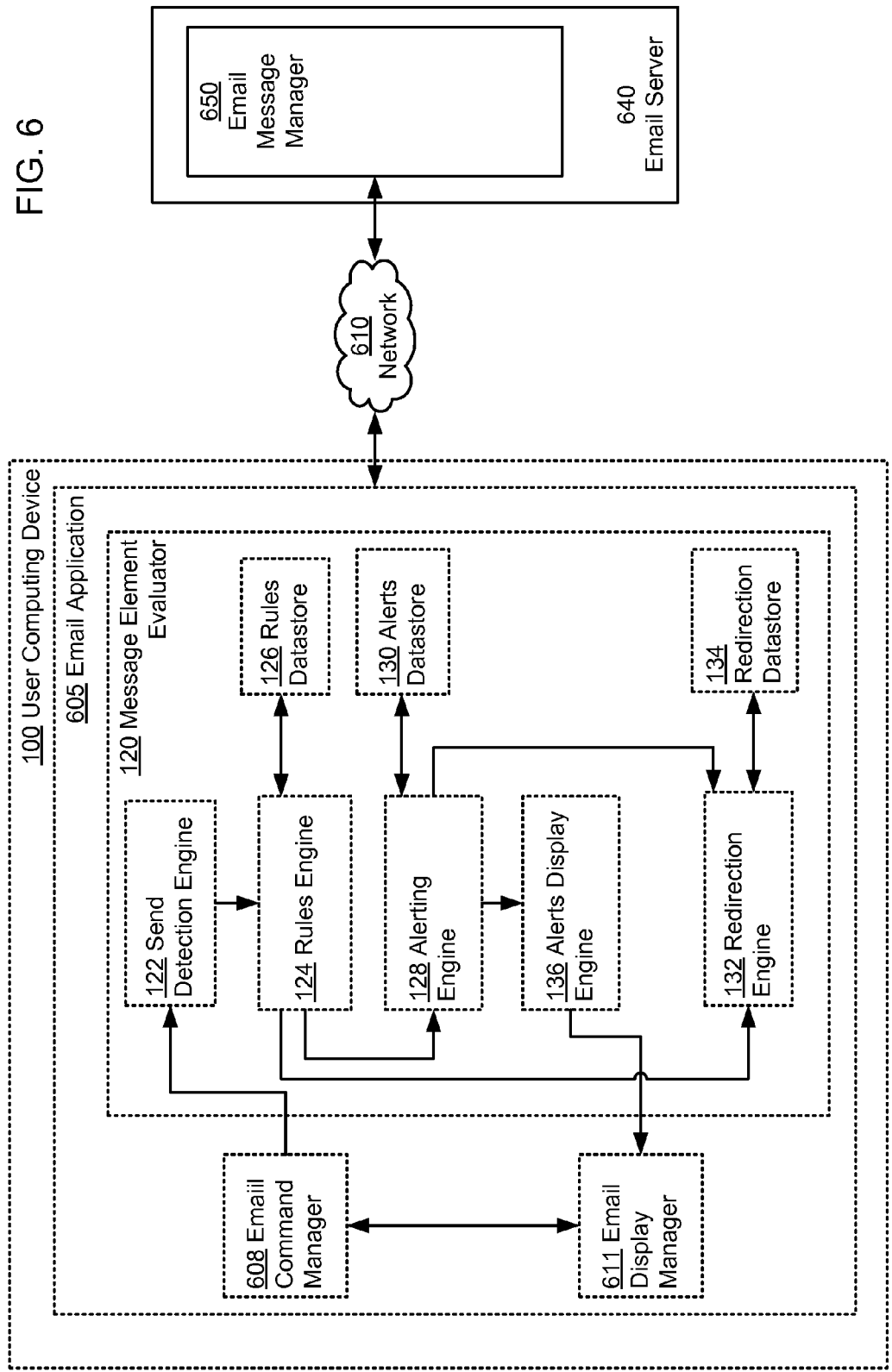
FIG. 6 is a block diagram of the logical components of a message element evaluator operating in an email application according to an embodiment.

FIG. 6 is a block diagram of example functional components of an email embodiment. A user computing device 600 operates an email application 605. The email application 605 may include an email command manager 608 and an email display manager 611. The email display manager 611 may generate a GUI that is displayed on the user computing device 600. The graphical user interface (GUI) displays objects that may be selected by a user using an input device to issue commands to the email command manager 608.

Like the general messaging application 105 described above with reference to FIG. 2, the email application 605 may be configured to receive message field elements from a user via one or more input devices (not illustrated). The email application 605 may be configured to cooperate with the message element evaluator 120 as described above with reference to FIG. 2. Email application 605 may communicate with an email message manager 650 operated by an email server 640 via an e-mail capable network 610.

Email protocols typically permit emails to be addressed in various ways. A user may enter the email address of the intended recipient in a "to," "cc," or "bcc" line via a GUI presented to the user of the email application 605. The address of an addressee may also be automatically inserted into a field in response to a few keystrokes (sometimes referred to as "autocomplete"). A user may also select a group name that represents a list of addressees. Anyone of these methods of entering the name of an addressee may result in the erroneous selection of address that is not the address of the intended recipient.

As described above with reference to FIG. 2, the message element evaluator 120 may be configured to detect the selection of the "send" command by a user of the email application 605. The detection of a "send" command by the message element evaluator 120 is described above with reference to FIG. 2.

As described above with reference to FIG. 2, when a send command is detected, the rules engine 124 evaluates the fields of the email message using rules that may be selected from a rules datastore 126 before the email is allowed to be sent by the email application 605. Beyond the example rules described above with reference to FIG. 2, rules engine 124 may apply rules to the email message date such as to determine whether an email may be sent by a user or to an email recipient on a particular day.

In an embodiment, the rules engine 124 may perform a keyword search of the email fields to determine whether the conditions of a selected rule have been met. For example, the rules engine 124 may look for keywords such as company names (e.g. Acme Co. and Beta Co.) or domains (e.g., Acme.com and Beta.com). The keywords for such a search may be saved in the rules datastore 126. In this example embodiment, the rules datastore 126 may include a set of default keywords and a set of user-selected keywords.

As described above with reference to FIG. 2, the rules engine 124 may provide its results to an alerting engine 128 and, optionally, to a redirection engine 132. The alerting engine 128 may refer to an alerts database 130 to select an alert that is appropriate to the determination made by the rules engine 124.

If the appropriate alert is cautionary or informative, the alert display engine 136 may further cooperates with the email display manager 611 to display a "confirm send" command object, an "edit message" and/or a "cancel message" object. Activation of the "confirm send" command object would cause release of the email for transmission by the email application 605 to the email server 640 via the email network 610.

In an embodiment, the alerts display engine 136 may create a copy of the email message with identified key words highlighted. The highlighted copy of the email message may be provided to the email display manager 611 for display on the user computing device 100. Highlighted text may be indicated by color, underlining, bolding or other visual cues.

In an embodiment, the rules engine 124 optionally may pass rules violation determinations to the redirection engine 132. The redirection engine 132 may be configured to review the determinations of the rules engine 124 and the alert engine 128 and determine whether the email message and/or the alert should be redirected to another address. Alternatively or in addition, the alert that corresponds to the rules violation may be redirected to an IP manager and logged for further action.

Figure 7:
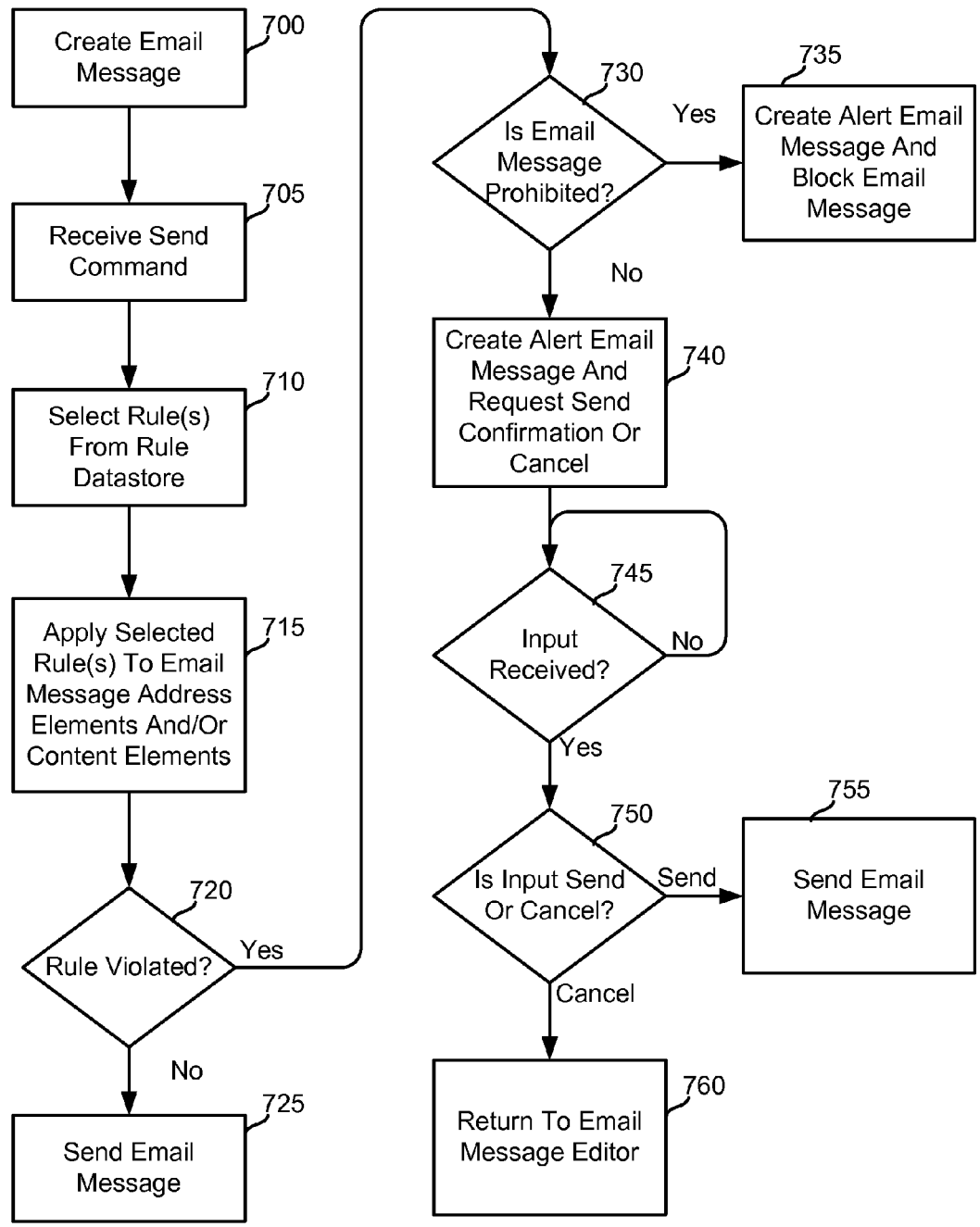
FIG. 7 is a process flow diagram illustrating a flow of an email message evaluation process according to an embodiment.

FIG. 7 is a process flow diagram illustrating evaluation an email message according to an embodiment. An email message may be created using an email application 605 operating on a user computing device 100, step 700. When the email application 605 receives a send command from the user, step 705, the message element evaluator 120 may select one or more rules from a rule datastore 126, step 710. The message element evaluator 120 may apply the selected rule or rules to the message address elements, the message content elements or both as dictated by the selected rules or rules, selected 715.

The rules engine 124 may determine whether any of the selected rules have been violated, determination 720. When a rule has not been violated (i.e., determination 720="No"), the email message may be sent to the email server 640 for transmission to the addressees, step 725. When a rule has been violated (i.e., determination 720="Yes"), the rules engine 124 (or another functional element of the message element evaluator 120) may determine whether the violated rule prohibits transmission of the email message, determination 730. When the rule prohibits transmission of the email message (i.e., determination 730="Yes"), an alert message may be displayed informing the user that sending the email message may be prohibited and the email may be blocked, step 735. The message element evaluator blocks the email message from being sent. When the rule does not prohibit the sending of the email message (i.e., determination 730="No"), an alert message may be displayed informing the user that a rule has been violated and requesting the user to confirm transmission of the message or edit or cancel the email message send command, step 740.

The message element evaluator 120 may wait for reception of a user input, determination 745, which may be subject to a time-out threshold (not illustrated). If a time-out threshold is reached before an input is received, the email message may be canceled and processing returned to the email application 605.

When a user input is received, (i.e., determination 745="Yes"), the message element evaluator 120 may determine whether the input is a send confirmation or cancel command, determination 750. When the input is a send confirmation command (i.e., determination 750="Send"), the email message may be transmitted to the email server 640, step 755. When the received user input is a cancel command (i.e., determination 750="Cancel"), the message send command may be canceled and processing may be returned to the email command manager 608 of the email application 605 to enable the user to edit the email message or draft a different one, step 760.

Figure 8:
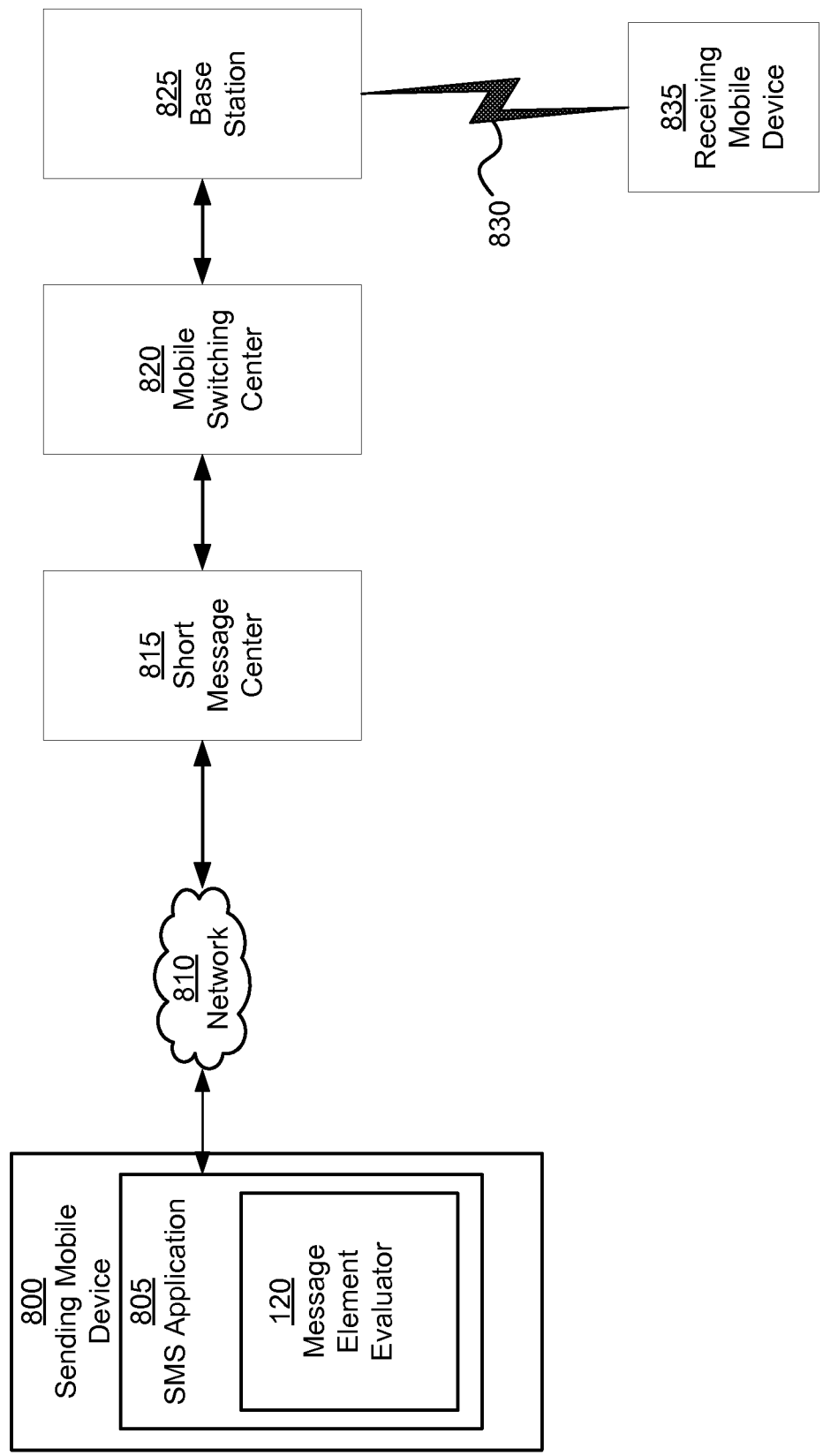
FIG. 8 is a block diagram of the logical components of a message element evaluator operating in an SMS application according to an embodiment.

FIG. 8 is a block diagram of the functional components of an SMS message system according to an embodiment. In this system, a mobile device 800 operates an SMS application 805 configured to enable users to create messages in the SMS message format. The SMS application sends completed SMS message via a cellular data network 810 to an SMS message center 815. The SMS message may be passed to a mobile switching center 820 which routes the SMS message to a cellular base station 825 in communication with the mobile device to which the SMS message is directed. The base station 825 delivers the message to a mobile device 835 associated with the addressee of the SMS message via cellular data communications 830.

In this embodiment, the SMS application 805 includes a message element evaluator 120, the functions of which are described above with reference to FIG. 2. The message element evaluator 120 evaluate an SMS message against rules prior to transmission of the SMS message to the SMS message center 815 as described above with reference to FIG. 2. The process for evaluating an SMS message is similar to that described above with reference to FIG. 3.

Figure 9:
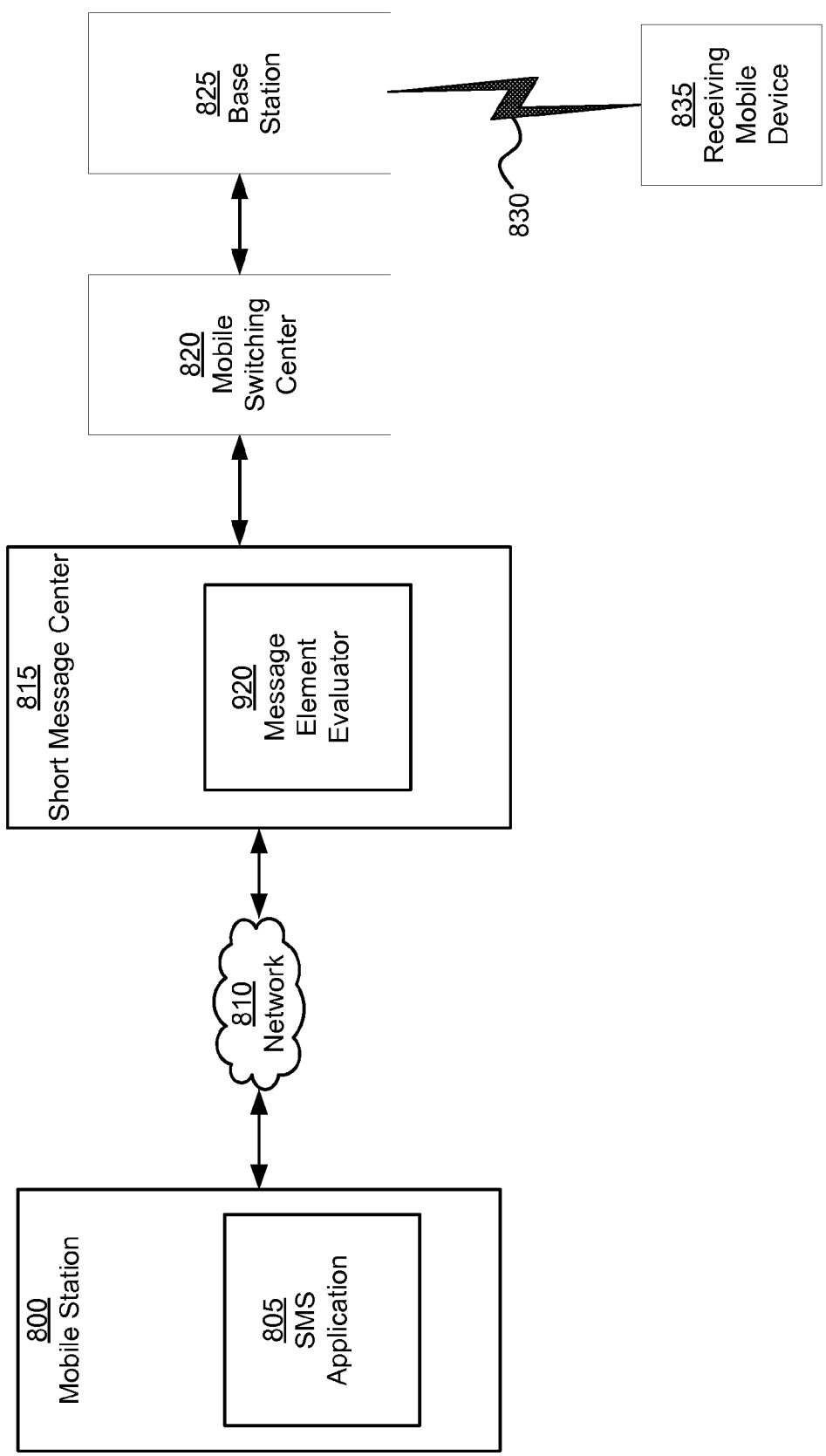
FIG. 9 is a block diagram of the logical components of a message element evaluator operating in an SMS center according to an embodiment.

FIG. 9 is a block diagram of example functional components of an SMS messaging system in which the message element evaluator 920 operates with the SMS message center 815 according to an embodiment. In this embodiment, the short message center 815 includes the message element evaluator 920 so that the message evaluation functionality and rules datastore need not be configured into the mobile device. The functions of the message element evaluator 920 are described above with reference to FIGS. 3 and 5. In this embodiment, SMS messages received at the SMS message center 815 are evaluated by the message element evaluator 120 against rules being transmitted on to the addressed mobile device 835. The functionality of the message element evaluator 920 may be similar to that described above with reference to FIGS. 3 and 5 with the exception that the SMS application 805 on the mobile device 800 may not be able to receive commands to display an alert, and so the message element evaluator 920 may communicate an alert in the form of a reply SMS message.

While FIGS. 8 and 9 have been described in the context of an SMS messaging system, the functional elements may also be applied to a multimedia messaging system (MMS). In such an embodiment, the message element evaluator 120 may apply rules applicable to the audio, video, and image files that may be embedded within an MMS message. The process for evaluating an MMS message is also similar to that described above with reference to FIGS. 3 and 5 with the exception that an MMS application on the mobile device 800 may not be able to receive commands to display an alert, and so the message element evaluator 920 may communicate an alert in the form of a reply SMS or MMS message.

Figure 10:
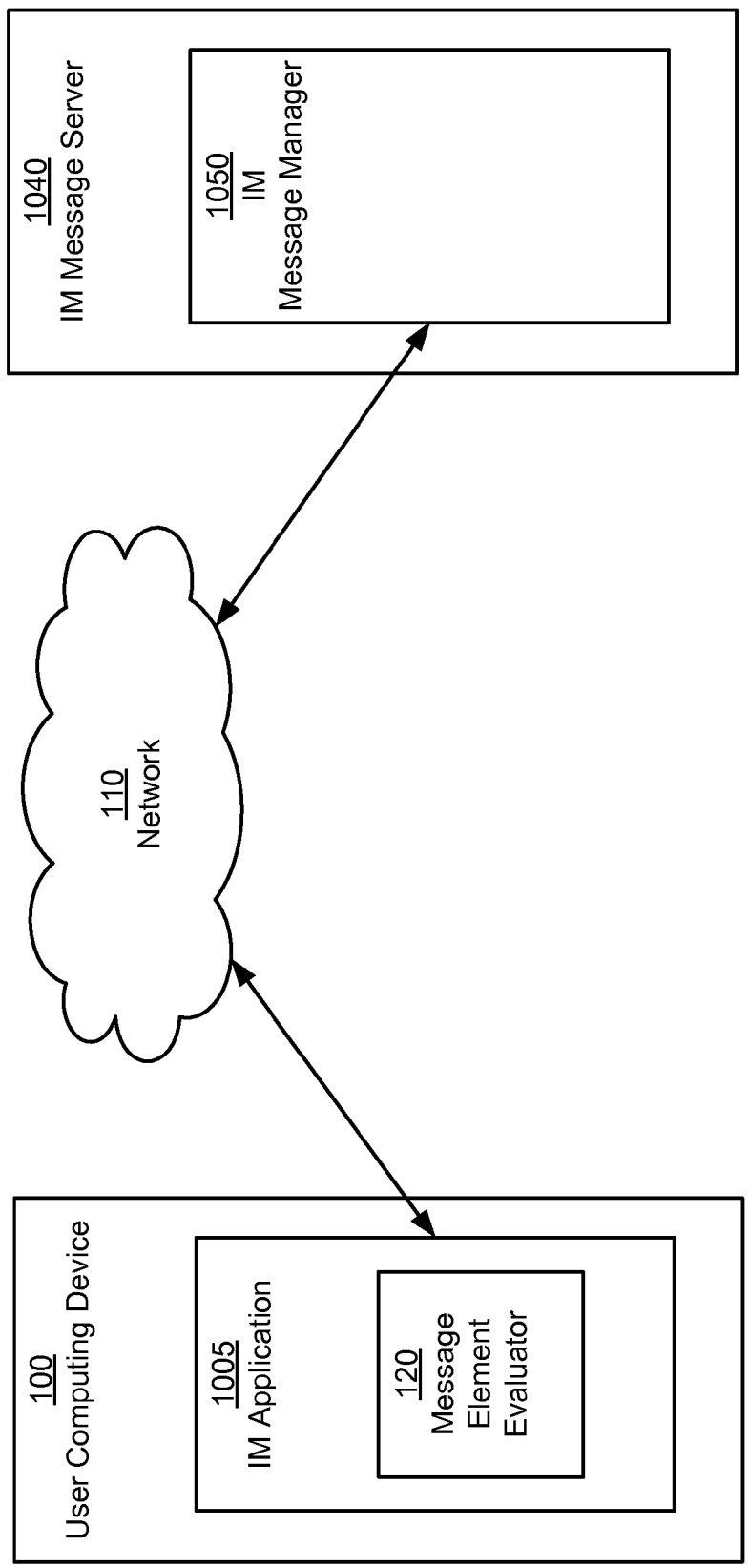
FIG. 10 is a block diagram of the logical components of a message element evaluator operating in an IM application according to an embodiment.

FIG. 10 is a block diagram of the logical components of an instant messaging (IM) system according to an embodiment. A user computing device 100 operates an IM application 1005. The IM application 1005 may be configured to receive message field elements from a user via one or more input devices. The message field elements may include the message content elements, message address elements and other message field elements that may be used by the IM application 1005 to construct and send an IM message.

In this embodiment, the IM message application 1005 includes a message element evaluator 120, the functions of which are described above with reference to FIG. 2. The message element evaluator 120 evaluates an IM message against rules prior to transmission of the IM message to the IM message server 1040.

Figure 11:
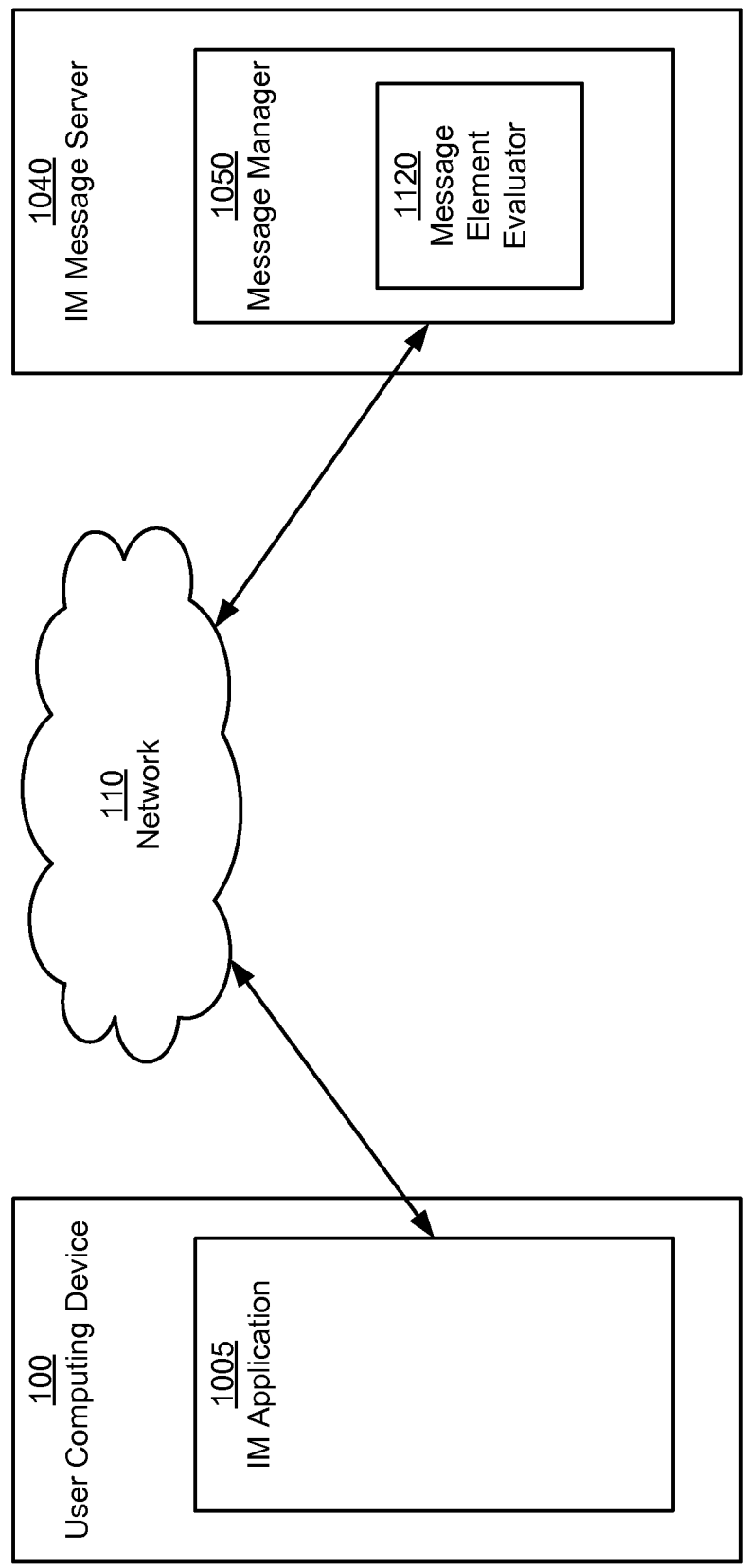
FIG. 11 is a block diagram of the logical components of a message element evaluator operating in an IM server according to an embodiment.

FIG. 11 is a block diagram of example components of an IM messaging system according to an embodiment. In this embodiment, the IM message server 1040 includes a message element evaluator 1120. The functions of the message element evaluator 1120 are described above with reference to FIGS. 2, 3 and 5. The message element evaluator 1120 may evaluate an IM message received by the IM message server 1040 against rules prior to transmission of the IM message to the message addressee. The process for evaluating an IM message is also similar to that described above with reference to FIGS. 3 and 5 with the exception that an IM application 1005 on the computing device 100 may not be able to receive commands to display an alert, and so the message element evaluator 1120 may communicate an alert in the form of a reply IM message.

Figure 12:
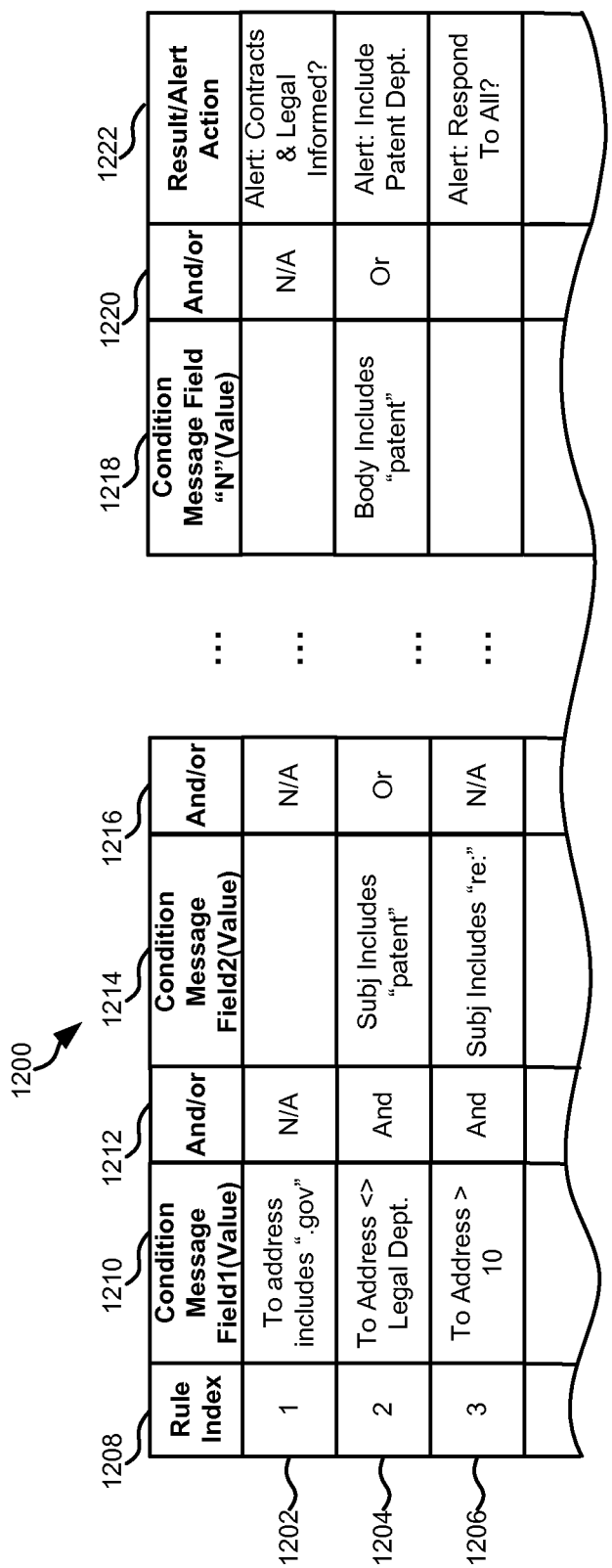
FIG. 12 is a data structure diagram of a data structure suitable for use with the various embodiments.

In the various embodiments the rules datastore 126 may store rules in a variety of data structures. FIG. 12 illustrates an example data structure suitable for use with the various embodiments. In this example data structure, rules are stored in a data table as a series of data records 1202-1206 which each contain a plurality of data fields 1208-1222 storing information that constitutes the rule conditions, data fields 1210-1220, and the resulting actions and/or alerts to be implemented if the rule condition(s) are satisfied, data field 1222. The data table may also include an index, data field 1208, for organizing or enabling rapid access to particular rules. The rules datastore 126 may include any number of data fields to accommodate multifactor conditions and conditions applied to multiple message elements. Condition data fields 1210, 1214, 1218 may be associated with conjunctive condition data fields 1212, 1216, 1220 which specify whether the corresponding condition must be met or may optionally be met in order for the rule to be satisfied. For example, as illustrated in FIG. 12, a rule may test the addressee message elements to determine if the message is addressed to an organization or individual within the United States government, and if so generate an alert for the sender inquiring whether the contracts or legal departments are informed of the communication as illustrated in data record 1202. In this example, a first condition may be that the to address includes a domain name associated with the government as shown in data record 1202 data field 1210. If this condition is met, then the associated result or alert stored in data field 1222 to post a message inquiring about whether contracts and/or legal are informed may be activated. A second example rule stored in data record 1204 tests whether the addressees includes the legal department or a company lawyer, data field 1210, and also (as indicated by "And" in data field 1212) whether the subject line includes the word "patent," data field 1214, or alternatively (as indicated by "Or" in both data fields 1216 and 1220) whether the message body includes the word "patent," data field 1218. If these conditions are met, then the associated result or alert stored in data field 1222 to include the patent department as an addressee may be activated. A third example rule stored in data record 1206 tests whether there are more than ten addressees, data field 1210, and also (as indicated by "And" in data field 1212) whether the subject line includes "re:" indicating the message is in reply to a previous message, data field 1214. If these conditions are met, then the associated result or alert stored in data field 1222 may generate an alert that the message is being sent as a "reply to all."

One of skill in the art would appreciate that the example data structure shown in FIG. 12 is only one of a wide variety of data structures that may be used for the rules datastore 126. For example, rules may alternatively be stored as XML strings, nested if-then executable software instructions, and entries in a commercially available database. Additionally, it should be appreciated that the rules datastore 126 may be stored in external memory as well as internal memory of the computing device. Such external memory may be any known storage device coupled to the computing device by wired data connections (e.g., USB cable, local area network, or Internet connection) or wireless data links (e.g., WiFi, Bluetooth, or cellular data communication links). For example, the datastore 126 may be in a USB memory, company server accessed via a local area network, or in a remote server accessed via the Internet.

As previously described, a user may interact with a messaging system using a variety of computing devices, including mobile devices such as, for example, cellular telephones, personal data assistants (PDA) with cellular telephone and/or WIFI transceivers, mobile electronic mail receivers, mobile web access devices, and other processor-equipped devices that may be developed in the future that connect to one or more data communication links. Typical mobile devices suitable for use with the various embodiments will have in common the components illustrated in FIG. 13. For example, the exemplary mobile device 1300 may include a processor 1301 coupled to internal memory 1302, a display 1303. Additionally, the mobile device 1300 may have an antenna 1304 for sending and receiving electromagnetic radiation that is connected to a wireless data link and/or cellular telephone transceiver 1305 coupled to the processor 1301. In some implementations, the transceiver 1305 and portions of the processor 1301 and memory 1302 used for cellular telephone communications are collectively referred to as the air interface since it provides a data interface via a wireless data link. Mobile devices typically also include a key pad 1306 or miniature keyboard and menu selection buttons or rocker switches 1307 for receiving user inputs.

The processor 1301 may be any programmable microprocessor, microcomputer or multiple processor chip or chips that can be configured by software instructions (applications) to perform a variety of functions, including the functions of the various embodiments described herein. In some mobile devices, multiple processors 1301 may be provided, such as one processor dedicated to wireless communication functions and one processor dedicated to running other applications. Typically, software applications may be stored in the internal memory 1302 before they are accessed and loaded into the processor 1301. In some mobile devices, additional external or internal memory chips ("removable memory") 1308 (e.g., a Secure Data (SD) card or Universal Serial Bus (USB) memory device) may be plugged into the computing device 1300 and coupled to the processor 1301. In many mobile devices, the internal memory 1302 may be a volatile or nonvolatile memory, such as flash memory, or a mixture of both. Also, as mentioned above, additional memory may be in the form of external memory stores that are coupled to the processor 1301 by wired or wireless data communication links. For the purposes of this description, a general reference to memory refers to all memory accessible by the processor 1301, including external memory, internal memory 1302, removable memory 1308 plugged into the mobile device, and memory within the processor 1301 itself.

Figure 14:
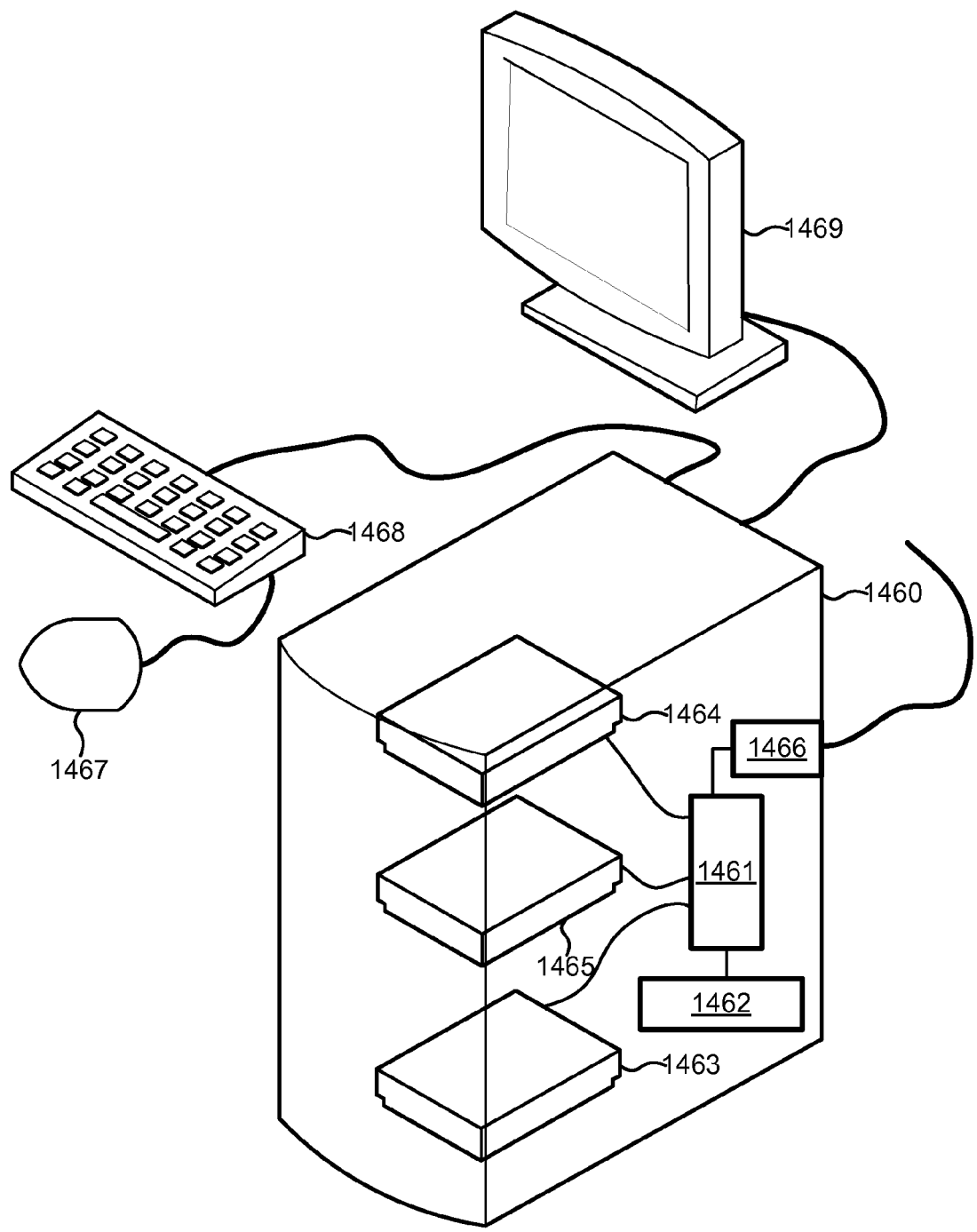
FIG. 14 is a component block diagram of a computer system suitable for use with the various embodiments.

The embodiments described above may also be implemented on any of a variety of computing devices, such as a personal computer 1460 illustrated in FIG. 14. Such a personal computer 1460 typically includes a processor 1461 coupled to volatile memory 1462 and a large capacity nonvolatile memory, such as a disk drive 1463. The personal computer 1460 may also include a floppy disc drive 1464 and a compact disc (CD) drive 1465 coupled to the processor 1461. Typically the personal computer 1460 will also include a pointing device 1461 such as a mouse, a user input device such as a keyboard 1468 and a display 1469. The personal computer 1460 may also include a number of connector ports 1465 coupled to the processor 1461 for establishing data connections or receiving external memory devices, such as a USB or FireWire® connector sockets or other network connection circuits 1466 for coupling the processor 1461 to a network or external memory. In a notebook configuration, the computer housing includes the pointing device 1467, keyboard 1468 and the display 1469 as is well known in the computer arts. Also, as mentioned above, additional memory may be in the form of external memory stores that are coupled to the processor 1461 by wired or wireless data communication links. For the purposes of this description, a general reference to memory refers to all memory accessible by the processor 1461, including external memory, internal memory 1462, 1463, 1465, removable memory plugged into the personal computer 1460, and memory within the processor 1461 itself.

Figure 15:
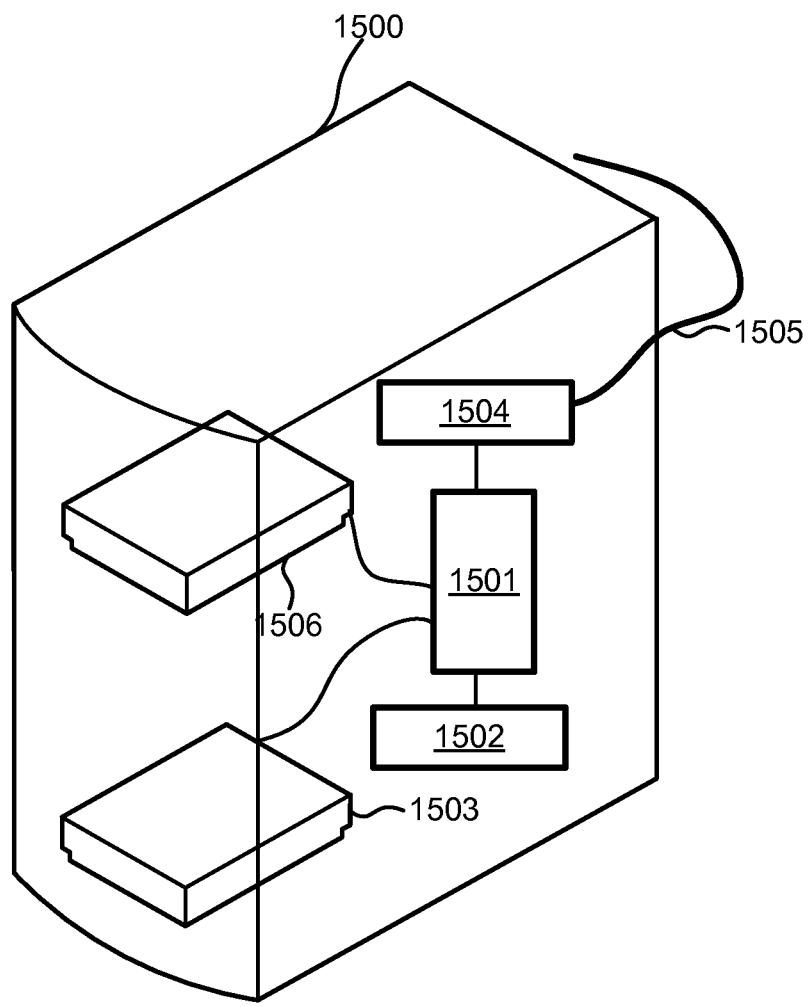
FIG. 15 is a component block diagram of a server suitable for use with the various embodiments.

A number of the aspects described above may also be implemented with any of a variety of remote server devices, such as the server 1500 illustrated in FIG. 15. Such a server 1500 typically includes a processor 1501 coupled to volatile memory 1502 and a large capacity nonvolatile memory, such as a disk drive 1503. The server 1500 may also include a floppy disc drive and/or a compact disc (CD) drive 1506 coupled to the processor 1501. The server 1500 may also include a number of connector ports 1504 coupled to the processor 1501 for establishing data connections with network circuits 1505.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, references to step identifiers and words such as "thereafter," "then," "next," etc. are not intended to limit the order of the steps; such identifiers and words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein.

What is claimed is:

1. A method for evaluating an outbound message comprising:
   receiving an outbound message from a messaging application, wherein the message comprises a first field element and a second field element;
   accessing a message evaluation rule established by an administrator and stored in a datastore, wherein:
      the message evaluation rule comprises a condition relating a specific data value of the first field element to a specific data value of the second field element; and
      the message evaluation rule is configured to filter outbound messages originated by each of a plurality of user devices based on the condition relating the specific data value of the first field element to the specific data value of the second field element;
   applying the message evaluation rule to the first field element and second field element of the outbound message;
   determining whether the condition of the message evaluation rule is satisfied;
   generating a display to alert a user when the condition of the message evaluation rule is satisfied; and
   sending the outbound message when the condition of the message evaluation rule is not satisfied.

2. The method of claim 1, wherein the first field element is a first message address element and the second field element is a second message address element.

3. The method of claim 1, wherein the first field element is a message address element and the second field element is a message content element.

4. The method of claim 1, wherein at least one of the first and second field elements is a message address element.

5. The method of claim 1, wherein the display further comprises a request for a response from the user selected from a group consisting of a send confirmation command, an edit message command, and a cancel message command,
   wherein the method further comprises:
      receiving a user response;
      transmitting the outbound message when the received user response is the send confirmation command;
      returning processing of the outbound message to the messaging application when the received user response is the edit message command; and
      cancelling the outbound message when the received user response is the cancel message command.

6. The method of claim 1, wherein the display further comprises a description of the condition satisfying the message evaluation rule.

7. The method of claim 6, wherein the display further comprises an instruction requiring revision of at least one of the field elements related by the condition.

8. The method of claim 1, wherein the outbound message is an email and the messaging application is an email application.

9. The method of claim 1, wherein the outbound message is a simple message system message and the messaging application is a simple message system application.

10. The method of claim 1, wherein the outbound message is an instant message and the messaging application is an instant message system application.

11. The method of claim 1, wherein the outbound message is a multimedia message system message and the messaging application is a multimedia message system application.

12. A computing device, comprising:
   a memory having stored therein a message evaluation rule established by an administrator, wherein:
      the message evaluation rule comprises a condition relating a specific data value of a first field element to a specific data value of a second field element; and
      the message evaluation rule is configured to filter outbound messages originated by each of a plurality of user devices based on the condition relating the specific data value the first field element to the specific data value of the second field element; and
   a processor coupled to the memory, wherein the processor is configured with a messaging application and with processor-executable instructions to perform operations comprising:
      receiving an outbound message from the messaging application, wherein the outbound message comprises a plurality of field elements including the first field element and the second field element;
      applying the message evaluation rule to the first field element and second field element of the outbound message;
      determining whether the condition of the message evaluation rule is satisfied;

generating a display to alert a user in response to determining that the condition of the message evaluation rule is satisfied; and
sending the outbound message in response to determining that the condition of the message evaluation rule is not satisfied.

13. The computing device of claim 12, wherein the first field element is a message address element and the second field element is a message address element.

14. The computing device of claim 12, wherein the first field element is a message address element and the second field element is a message content element.

15. The computing device of claim 12, wherein at least one of the first and second field elements is a message address element.

16. The computing device of claim 12, wherein the display further comprises a request for a response from the user selected from a group consisting of a send confirmation command, an edit message command, and a cancel message command,
wherein the processor is configured with processor-executable instructions to perform further operations comprising:
receiving a user response;
transmitting the outbound message when the received user response is the send confirmation command;
returning processing of the outbound message to the messaging application when the received user response is the edit message command; and
cancelling the outbound message when the received user response is the cancel message command.

17. The computing device of claim 12, wherein the display further comprises a description of the condition satisfying the message evaluation rule.

18. The computing device of claim 17, wherein the display further comprises an instruction requiring revision of at least one of the field elements related by the condition.

19. The computing device of claim 12, wherein the outbound message is an email and the messaging application is an email application.

20. The computing device of claim 12, wherein the outbound message is a simple message system message and the messaging application is a simple message system application.

21. The computing device of claim 12, wherein the outbound message is an instant message and the messaging application is an instant message system application.

22. The computing device of claim 12, wherein the outbound message is a multimedia message system message and the messaging application is a multimedia message system application.

23. A computing device, comprising:
means for storing a message evaluation rule established by an administrator, wherein:
the message evaluation rule comprises a condition relating a specific data value of a first field element to a specific data value of a second field element; and
the message evaluation rule is configured to filter outbound messages originated by each of a plurality of user devices based on the condition relating the specific data value of the first field element to the specific data value of the second field element;
means for receiving an outbound message from a messaging application, wherein the outbound message comprises a plurality of field elements including the first field element and the second field element;
means for applying the message evaluation rule to the first field element and second field element of the outbound message;
means for determining whether the condition of the message evaluation rule is satisfied;
means for generating a display to alert a user in response to determining that the condition of the message evaluation rule is satisfied; and
means for sending the outbound message in response to determining that the condition of the message evaluation rule is not satisfied.

24. The computing device of claim 23, wherein the first field element is a message address element and the second field element is a message address element.

25. The computing device of claim 23, wherein the first field element is a message address element and the second field element is a message content element.

26. The computing device of claim 23, wherein at least one of the first and second field elements is a message address element.

27. The computing device of claim 23, wherein the means for generating a display to alert a user in response to determining that the condition of the message evaluation rule is satisfied further comprises:
means for requesting a response from the user selected from the group consisting of a confirmation command, an edit message command, and a cancel message command,
wherein the computing device further comprises:
means for receiving a user response;
means for transmitting the outbound message when the received user response is the send confirmation command;
means for returning processing of the outbound message to the messaging application when the received user response is the edit message command; and
means for cancelling the outbound message when the response is the cancel message command.

28. The computing device of claim 23, wherein the means for generating a display to alert a user when the condition of the message evaluation rule is satisfied further comprises means for generating a display including a description of the condition satisfying the rule.

29. The computing device of claim 28, wherein the means for generating a display to alert a user in response to determining that the condition of the message evaluation rule is satisfied further comprises means for generating an instruction requiring revision of at least one of the field elements related by the condition.

30. The computing device of claim 23, wherein the outbound message is an email and the messaging application is an email client.

31. The computing device of claim 23, wherein the outbound message is a simple message system message and the messaging application is a simple message system application.

32. The computing device of claim 23, wherein the outbound message is an instant message and the messaging application is an instant message system application.

33. The computing device of claim 23, wherein the outbound message is a multimedia message system message and the messaging application is a multimedia message system application.

34. A non-transitory computer-readable medium having stored thereon processor-executable instructions configured to cause a processor to perform operations comprising:

storing a message evaluation rule established by an administrator, wherein:
the message evaluation rule comprises a condition relating a specific data value of a first field element to a specific data value of a second field element; and
the message evaluation rule is configured to filter outbound messages originated by each of a plurality of user devices based on the condition relating the specific data value of the first field element to the specific data value of the second field element;
receiving an outbound message from a messaging application wherein the outbound message comprises a plurality of field elements including the first field element and second field element;
applying the message evaluation rule to the first field element and second field element of the outbound message;
determining whether the condition of the message evaluation rule is satisfied;
generating a display to alert a user in response to determining that the condition of the message evaluation rule is satisfied; and
sending the outbound message in response to determining that the condition of the message evaluation rule is not satisfied.

35. The non-transitory computer-readable medium of claim 34, wherein the first field element is a message address element and the second field element is a message address element.

36. The non-transitory computer-readable medium of claim 34, wherein the first field element is a message address element and the second field element is a message content element.

37. The non-transitory computer-readable medium of claim 34, wherein at least one of the first and second field elements is a message address element.

38. The non-transitory computer-readable medium of claim 34, wherein the stored processor-executable instructions are configured to cause the processor to perform operations further comprising:
requesting a response from the user selected from the group consisting of a send confirmation command, an edit message command, and a cancel message command;
receiving a user response;
transmitting the message when the received user response is the send confirmation command;
returning processing of the outbound message to the messaging application when the received user response is the edit message command; and
cancelling the outbound message when the received user response is the cancel message command.

39. The non-transitory computer-readable medium of claim 34, wherein the stored processor-executable instructions are configured to cause the processor to perform operations further comprising generating a description of the condition satisfying the message evaluation rule.

40. The non-transitory computer-readable medium of claim 39, wherein the stored processor-executable instructions are configured to cause the processor to perform operations further comprising generating an instruction requiring revision of at least one of the field elements related by the condition.

41. The non-transitory computer-readable medium of claim 34, wherein the outbound message is an email and the messaging application is an email client.

42. The non-transitory computer-readable medium of claim 34, wherein the outbound message is a simple message system message and the messaging application is a simple message system application.

43. The non-transitory computer-readable medium of claim 34, wherein the outbound message is an instant message and the messaging application is an instant message system application.

44. The non-transitory computer-readable medium of claim 34, wherein the outbound message is a multimedia message system message and the messaging application is a multimedia message system application.

45. The method of claim 1, further comprising generating a second display to alert a managing user in response to determining that the condition of the message evaluation rule is satisfied.

46. The method of claim 1, further comprising prohibiting sending the outbound message in response to determining that the condition of the message evaluation rule is satisfied.

47. The computing device of claim 12, wherein the processor is configured with processor-executable instructions to perform operations further comprising:
generating a second display to alert a managing user in response to determining that the condition of the message evaluation rule is satisfied.

48. The computing device of claim 12, wherein the processor is configured with processor-executable instructions to perform operations further comprising:
prohibiting sending the outbound message in response to determining that the condition of the message evaluation rule is satisfied.

49. The computing device of claim 23, further comprising means for generating a second display to alert a managing user in response to determining that the condition of the message evaluation rule is satisfied.

50. The computing device of claim 23, further comprising means for prohibiting sending the outbound message in response to determining that the condition of the message evaluation rule is satisfied.

51. The non-transitory computer-readable medium of claim 34, wherein the stored processor-executable instructions are configured to cause the processor to perform operations further comprising:
generating a second display to alert a managing user in response to determining that the condition of the message evaluation rule is satisfied.

52. The non-transitory computer-readable medium of claim 34, wherein the stored processor-executable instructions are configured to cause the processor to perform operation further comprising:
prohibiting sending the outbound message in response to determining that the condition of the message evaluation rule is satisfied.

53. A method for evaluating an outbound message comprising:
receiving the outbound message from a messaging application, wherein the outbound message comprises field elements;
accessing a message evaluation rule stored in a datastore, wherein the message evaluation rule comprises a condition selected from the group consisting of:
determining whether an intended recipient address matches any of a list of prohibited recipients;
determining whether a trademark or company name is used;
determining whether any of improper language and grammar appears in the body of the outbound message if the intended recipient address matches any of a list of previously identified recipient addresses;

determining whether a multimedia file is attached to the outbound message if the intended recipient address matches any of a list of previously identified recipient addresses;

determining whether any of a plurality of intended recipient addresses are previously identified as being mutually exclusive;

determining whether a number of intended recipient addresses exceeds a predetermined limit;

determining whether any of a plurality of intended recipient address domains are previously identified as being mutually exclusive;

determining whether any of a plurality of intended recipient addresses are previously identified as being prohibited from being sent from an originating user address; and determining whether the body of the message contains mutually exclusive references;

applying the message evaluation rule to at least the first field element and second field element;

determining whether the condition of the message evaluation rule is satisfied;

generating a display to alert a user in response to determining that the condition of the message evaluation rule is satisfied; and sending the outbound message in response to determining that the condition of the message evaluation rule is not satisfied.

54. A computing device, comprising:

a memory having stored therein a message evaluation rule that comprises a condition selected from the group consisting of:

determining whether an intended recipient address matches any of a list of prohibited recipients;

determining whether a trademark or company name is used;

determining whether any of improper language and grammar appears in the body of the outbound message if the intended recipient address matches any of a list of previously identified recipient addresses;

determining whether a multimedia file is attached to the outbound message if the intended recipient address matches any of a list of previously identified recipient addresses;

determining whether any of a plurality of intended recipient addresses are previously identified as being mutually exclusive;

determining whether a number of intended recipient addresses exceeds a predetermined limit;

determining whether any of a plurality of intended recipient address domains are previously identified as being mutually exclusive;

determining whether any of a plurality of intended recipient addresses are previously identified as being prohibited from being sent from an originating user address; and determining whether the body of the message contains mutually exclusive references; and a processor coupled to the memory, wherein the processor is configured with a messaging application and with processor-executable instructions to perform operations comprising:

receiving an outbound message from the messaging application, wherein the message comprises field elements;

accessing the message evaluation rule;

applying the message evaluation rule to at least the first field element and second field element;

determining whether the condition of the message evaluation rule is satisfied;

generating a display to alert a user in response to determining that the condition of the message evaluation rule is satisfied; and sending the outbound message in response to determining that the condition of the message evaluation rule is not satisfied.

55. A method for evaluating an outbound message comprising:

means for storing a message evaluation rule, wherein the message evaluation rule comprises a condition selected from the group consisting of:

determining whether an intended recipient address matches any of a list of prohibited recipients;

determining whether a trademark or company name is used;

determining whether any of improper language and grammar appears in the body of the outbound message if the intended recipient address matches any of a list of previously identified recipient addresses;

determining whether a multimedia file is attached to the outbound message if the intended recipient address matches any of a list of previously identified recipient addresses;

determining whether any of a plurality of intended recipient addresses are previously identified as being mutually exclusive;

determining whether a number of intended recipient addresses exceeds a predetermined limit;

determining whether any of a plurality of intended recipient address domains are previously identified as being mutually exclusive;

determining whether any of a plurality of intended recipient addresses are previously identified as being prohibited from being sent from an originating user address; and determining whether the body of the message contains mutually exclusive references;

means for receiving an outbound message from a messaging application, wherein the outbound message comprises a plurality of field elements including the first field element and the second field element;

means for accessing the message evaluation rule;

means for applying the message evaluation rule to at least the first field element and second field element of the outbound message;

means for determining whether the condition of the message evaluation rule is satisfied;

means for generating a display to alert a user in response to determining that the condition of the message evaluation rule is satisfied; and means for sending the outbound message in response to determining that the condition of the message evaluation rule is not satisfied.

56. A non-transitory computer-readable medium having stored thereon processor-executable instructions configured to cause a processor to perform operations comprising:

receiving an outbound message from a messaging application, wherein the message comprises field elements;

accessing a message evaluation rule stored in a datastore, wherein the message evaluation rule comprises a condition selected from the group consisting of:

determining whether an intended recipient address matches any of a list of prohibited recipients;

determining whether a trademark or company name is used;

determining whether any of improper language and grammar appears in the body of the outbound message if the intended recipient address matches any of a list of previously identified recipient addresses;

determining whether a multimedia file is attached to the outbound message if the intended recipient address matches any of a list of previously identified recipient addresses;

determining whether any of a plurality of intended recipient addresses are previously identified as being mutually exclusive;

determining whether a number of intended recipient addresses exceeds a predetermined limit;

determining whether any of a plurality of intended recipient address domains are previously identified as being mutually exclusive;

determining whether any of a plurality of intended recipient addresses are previously identified as being prohibited from being sent from an originating user address; and determining whether the body of the message contains mutually exclusive references;

applying the message evaluation rule to at least the first field element and second field element;

determining whether the condition of the message evaluation rule is satisfied;

generating a display to alert a user in response to determining that the condition of the message evaluation rule is satisfied; and sending the outbound message in response to determining that the condition of the message evaluation rule is not satisfied.

\* \* \* \* \*